US009859764B2

(12) United States Patent
Tsuiki et al.

(10) Patent No.: US 9,859,764 B2
(45) Date of Patent: Jan. 2, 2018

(54) ROTARY ELECTRIC MACHINE WITH DISTRIBUTED ARMATURE WINDING

(71) Applicant: MITSUBISHI ELECTRIC CORPORATION, Chiyoda-ku (JP)

(72) Inventors: Hironori Tsuiki, Chiyoda-ku (JP); Atsushi Sakaue, Chiyoda-ku (JP); Hiroyuki Akita, Chiyoda-ku (JP); Masaya Inoue, Chiyoda-ku (JP); Akira Hashimoto, Chiyoda-ku (JP)

(73) Assignee: MITSUBISHI ELECTRIC CORPORATION, Chiyoda-Ku, Tokyo (JP)

( * ) Notice: Subject to any disclaimer, the term of this patent is extended or adjusted under 35 U.S.C. 154(b) by 423 days.

(21) Appl. No.: 14/413,266

(22) PCT Filed: Jul. 17, 2013

(86) PCT No.: PCT/JP2013/069433
§ 371 (c)(1),
(2) Date: Jan. 7, 2015

(87) PCT Pub. No.: WO2014/017361
PCT Pub. Date: Jan. 30, 2014

(65) Prior Publication Data
US 2015/0207374 A1    Jul. 23, 2015

(30) Foreign Application Priority Data
Jul. 26, 2012 (JP) .................... 2012-165389

(51) Int. Cl.
*H02K 3/28* (2006.01)
*H02K 3/12* (2006.01)

(52) U.S. Cl.
CPC ............... *H02K 3/28* (2013.01); *H02K 3/12* (2013.01)

(58) Field of Classification Search
CPC .. H02K 3/28; H02K 3/12; H02K 3/18; H02K 3/46; H02K 3/48
(Continued)

(56) References Cited

U.S. PATENT DOCUMENTS

2005/0082923 A1* 4/2005 Akita ............... H02K 3/50
                                                    310/71
2012/0274171 A1* 11/2012 Ishikawa ............... H02K 3/28
                                                    310/195

FOREIGN PATENT DOCUMENTS

JP    2005-124319 A    5/2005
JP    2009-033832 A    2/2009
(Continued)

OTHER PUBLICATIONS

International Search Report (PCT/ISA/210) dated Oct. 1, 2013, by the Japanese Patent Office as the International Searching Authority for International Application No. PCT/JP2013/069433.
(Continued)

*Primary Examiner* — Michael Andrews
(74) *Attorney, Agent, or Firm* — Buchanan Ingersoll & Rooney PC

(57) ABSTRACT

A U-phase coil that constitutes the armature winding includes four (first through fourth) small coil groups U101, U102, U201, and U202 that make approximately one round circumferentially that are formed by connecting in series in order of circumferential arrangement winding bodies that are housed in slot pairs that are separated by 360 electrical degrees. The U-phase coil is configured by consecutively or alternately connecting the four first through fourth small coil groups U101, U102, U201, and U202 in series such that two of the small coil groups that are housed in identical slots are positioned.

6 Claims, 32 Drawing Sheets

(58) Field of Classification Search
USPC ............................... 310/202, 208, 195, 179
See application file for complete search history.

(56) References Cited

FOREIGN PATENT DOCUMENTS

| | | |
|---|---|---|
| JP | 2009-195011 A | 8/2009 |
| JP | 2009-278845 A | 11/2009 |
| JP | 2011-152000 A | 8/2011 |
| JP | 4823797 B2 | 11/2011 |
| JP | 2012-016195 A | 1/2012 |

OTHER PUBLICATIONS

Written Opinion (PCT/ISA/237) dated Oct. 1, 2013, by the Japanese Patent Office as the International Searching Authority for International Application No. PCT/JP2013/069433.

* cited by examiner

ROTARY ELECTRIC MACHINE WITH DISTRIBUTED ARMATURE WINDING

TECHNICAL FIELD

The present invention relates to a rotary electric machine such as an electric motor or a generator, for example, and particularly relates to an armature winding connecting construction.

BACKGROUND ART

In recent years, compactness, high output, and high quality have been required in rotary electric machines that are used as electric motors or generators. In high-output rotary electric machines of this kind, since high voltages are applied, electric potential differences that arise between coils that are mounted into an armature core have increased, and it has become necessary to have thicknesses of insulating material that can bear them. However, if the thickness of the insulating material is increased without changing the shape of the armature core, then coil space is reduced by an amount proportionate to the increase in the thickness of the insulating material, reducing efficiency of the rotary electric machine. If the thickness of the insulating material is increased without changing the coil space, then the diameter of the armature core is increased by an amount proportionate to the increase in the thickness of the insulating material, leading to increases in the size of the rotary electric machine.

In consideration of such conditions, various methods have been proposed to suppress the electric potential differences that arise between the coils.

In conventional rotary electric machines such as that described in Patent Literature 1, for example, revolution coils that are near terminals in respective phase coils are accommodated in slots that are not adjacent to slots in which other phase coils are accommodated, and revolution coils that are nearer to neutral points than revolution coils that are accommodated at positions that are circumferentially adjacent to the revolution coils that are near the terminals in slots that are adjacent to those slots are accommodated at positions in the slots in which the revolution coils that are near the terminals are accommodated that are radially adjacent to the revolution coils that are near the terminals. Electric potential differences that arise between the revolution coils in the coil ends are suppressed thereby.

In conventional rotary electric machines such as that described in Patent Literature 2, in a stator winding that is formed by wye-connecting respective phase windings that are formed by connecting in series a plurality of distributed-winding and lap-wound coils, respective phase windings are disposed such that a first coil that is connected to an input terminal, a final coil that is connected to a neutral point, and a plurality of intermediate coils are each arranged in a single row circumferentially so as to have different radial positions in each of the phases, two intermediate coils among the plurality of intermediate coils in each of the phases are disposed to be positioned on two circumferential sides of the same-phase first coil, and the first coil of each of the phases is radially adjacent to an intermediate coil of another phase or a final coil of another phase that is connected electrically nearer to an intermediate point than the two adjacent same-phase intermediate coils. Shared voltages between same-phase and inter-phase adjacent coils are thereby relieved.

CITATION LIST

Patent Literature

[Patent Literature 1] Japanese Patent No. 4823797 (Gazette)
[Patent Literature 2] Japanese Patent Laid-Open No. 2009-278845 (Gazette)

SUMMARY OF THE INVENTION

Problem to be Solved by the Invention

However, in conventional rotary electric machines such as that described in Patent Literature 1, electric potential differences cannot be suppressed between same-phase coils, and one problem has been that the thickness of the insulating material that is accommodated inside the slots is increased.

In conventional rotary electric machines such as that described in Patent Literature 2, because the respective phase windings connect in series a plurality of coils that are arranged circumferentially, if a winding configuration is adopted in which two or more coils are accommodated in one slot, also called a "multi-layer winding" configuration, situations may arise in which a coil that is connected on a side near an input terminal and a coil that is connected on a side near a neutral point are accommodated in an identical slot. As a result, one problem has been that electric potential differences between the coils reach a maximum and becomes equal to the applied voltage, preventing electric potential differences among the coils inside the slots from being suppressed, and making the thickness of the insulating material that insulates between the coils inside the slots thicker.

In addition, in conventional rotary electric machines such as that described in Patent Literature 2, because crossover portions that connect the coils together are longer, and the direction of crossover of the crossover portions is not unidirectional, other problems have been that winding resistance is increased, reducing the efficiency of the rotary electric machine, and that the rotary electric machine is also increased in diameter due to overlapping of the crossover portions.

The present invention aims to solve the above problems and an object of the present invention is to provide a rotary electric machine that can suppress thickness increases in insulating material inside slots by adapting connection of coils that constitute respective phase coils to suppress electric potential differences that arise between conductor wires inside the slots, and that also enables increased efficiency and downsizing by shortening lengths of crossover portions between winding bodies that constitute the coils.

Means for Solving the Problem

In order to achieve the above object, according to one aspect of the present invention, there is provided a rotary electric machine including an armature that is configured by mounting an armature winding into an annular armature core, slots being formed on the armature core at a ratio of q slots per phase per pole, where q is a natural number that is greater than or equal to two. The armature winding is configured such that distributed-winding winding bodies are arranged at a pitch of one slot circumferentially, the winding bodies being configured by winding conductor wires into two or three of the slots that are separated by a pitch of one magnetic pole from each other, respective phase coils that constitute the armature winding include 2q revolution coils that make one round circumferentially that are formed by connecting in series in order of circumferential arrangement winding bodies that are housed in an identical slot group and that are separated by 360 electrical degrees, and each of the phase coils is configured by consecutively or alternately connecting the 2q revolution coils in series such that two of the revolution coils that are housed in the identical slot group are positioned.

Effects of the Invention

According to the present invention, respective phase coils that constitute an armature winding include revolution coils that are formed by connecting in series in order of circumferential arrangement winding bodies that are separated by 360 electrical degrees. Thus, crossover portions that connect the winding bodies together are shorter, suppressing enlargements in diameter that result from overlapping of the crossover portions, and enabling downsizing to be achieved. Each of the phase coils is configured by consecutively or alternately connecting all of the revolution coils in series such that the revolution coils that are housed in an identical slot group are positioned. Thus, electric potential differences that arise between the conductor wires inside the slots are reduced, enabling the thickness of insulating material between the conductor wires inside the slots to be reduced. As a result, space factor can be increased by enlarging the cross-sectional area of the conductor portions of the conductor wires proportionately, enabling increased efficiency and improvements in heat radiating characteristics to be achieved.

DESCRIPTION OF EMBODIMENTS

Preferred embodiments of a rotary electric machine according to the present invention will now be explained with reference to the drawings.

Embodiment 1

Figure 1:
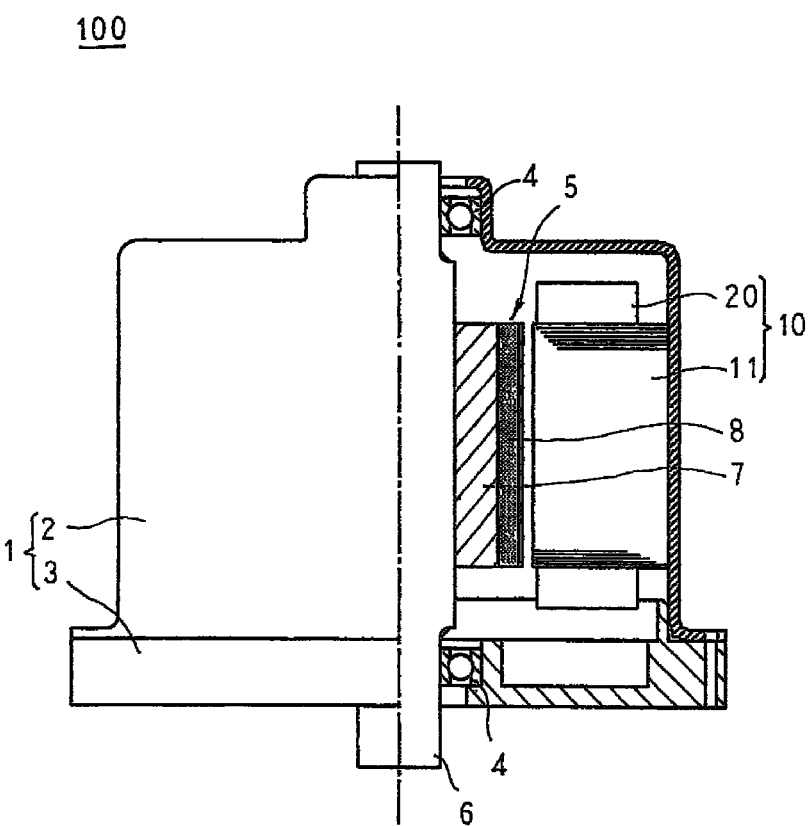
FIG. 1 is a half section that shows a rotary electric machine according to Embodiment 1 of the present invention.
Figure 2:
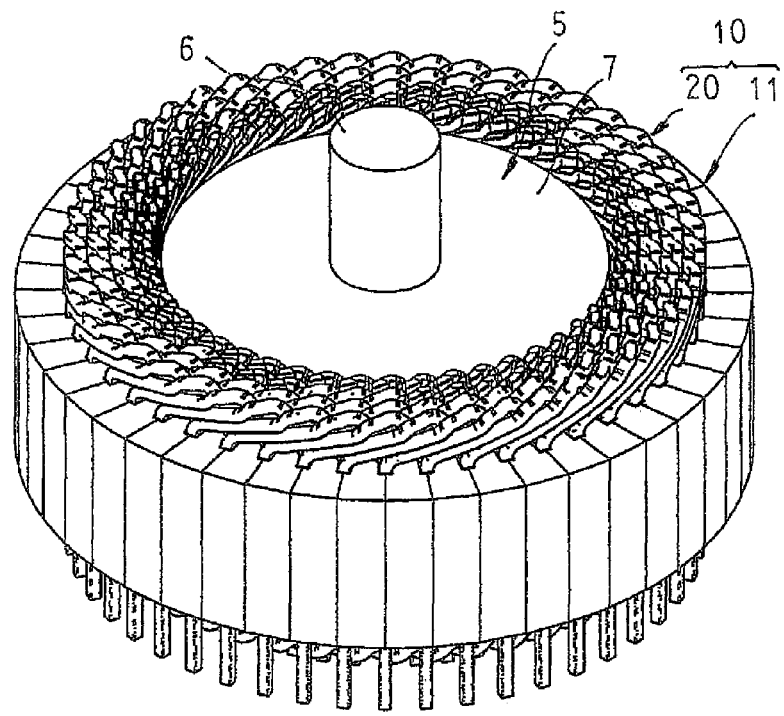
FIG. 2 is an oblique projection that shows part of the rotary electric machine according to Embodiment 1 of the present invention.
Figure 3:
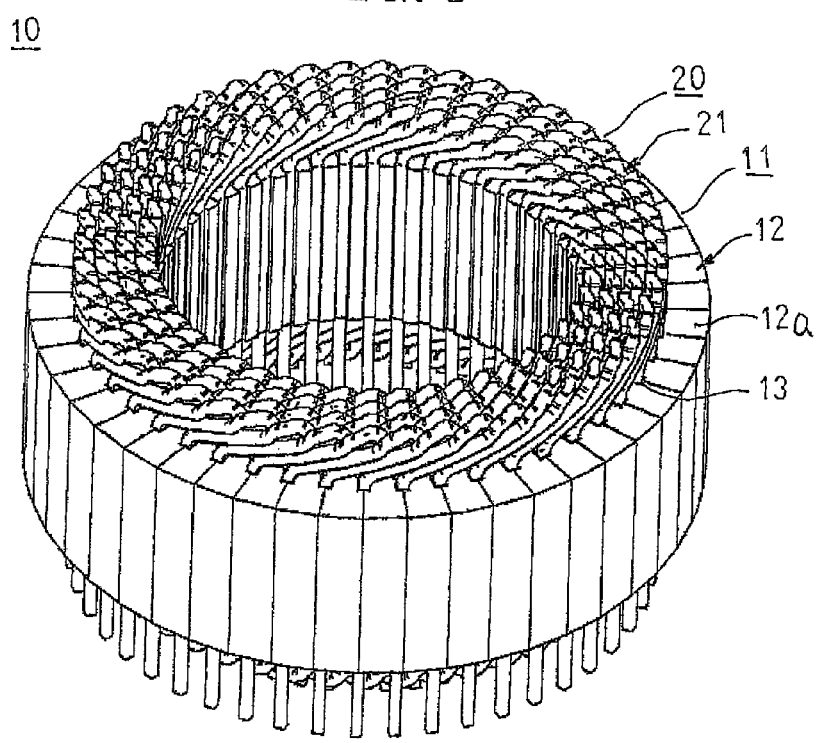
FIG. 3 is an oblique projection that shows an armature that is used in the rotary electric machine according to Embodiment 1 of the present invention.
Figure 4:
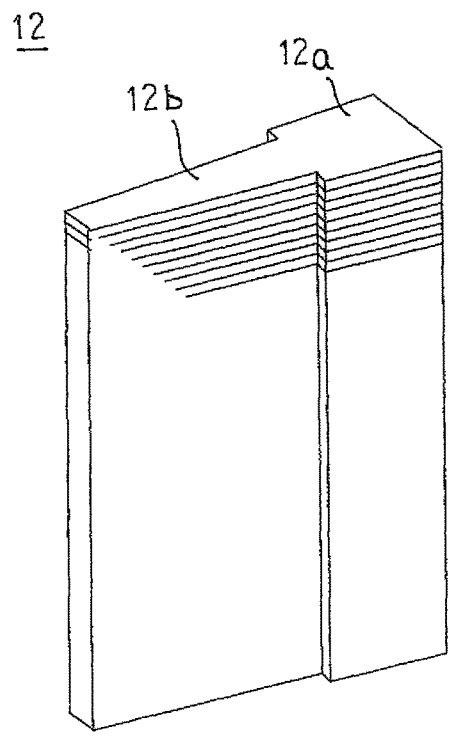
FIG. 4 is an oblique projection that shows a core block that constitutes an armature that is used in the rotary electric machine according to Embodiment 1 of the present invention.
Figure 5:
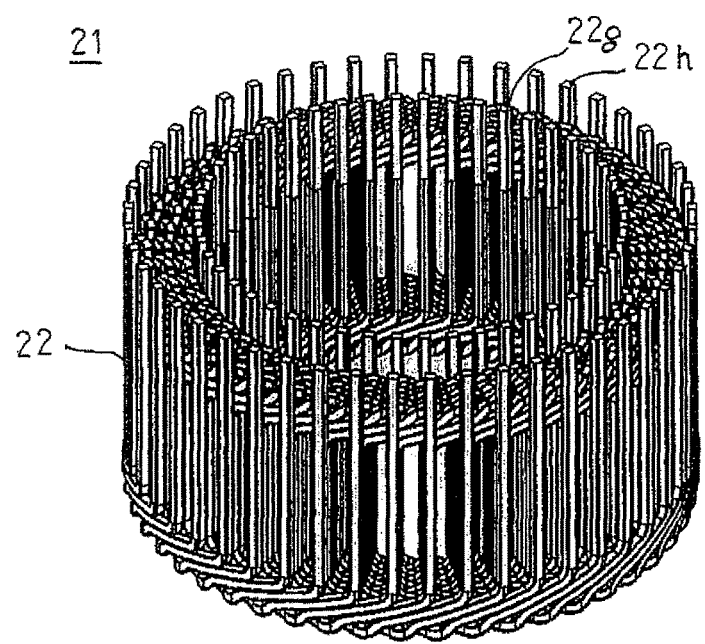
FIG. 5 is an oblique projection that shows a winding assembly that constitutes an armature winding of the armature that is used in the rotary electric machine according to Embodiment 1 of the present invention.
Figure 6:
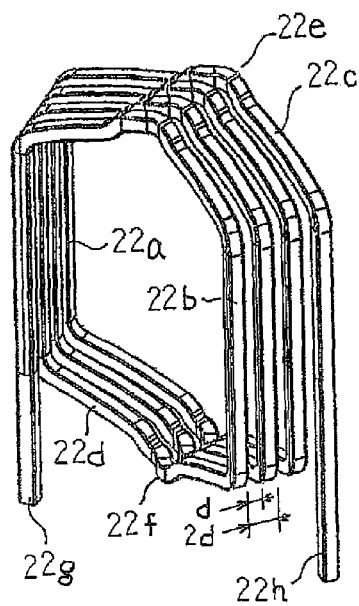
FIG. 6 is an oblique projection that shows a winding body that constitutes the winding assembly in the rotary electric machine according to Embodiment 1 of the present invention.
Figure 7:
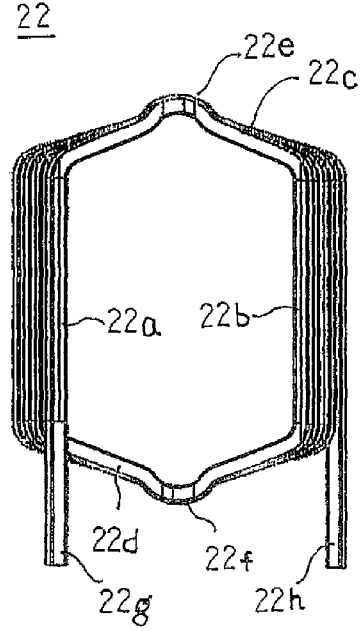
FIG. 7 is a front elevation that shows the winding body that constitutes the winding assembly in the rotary electric machine according to Embodiment 1 of the present invention.
Figure 8:
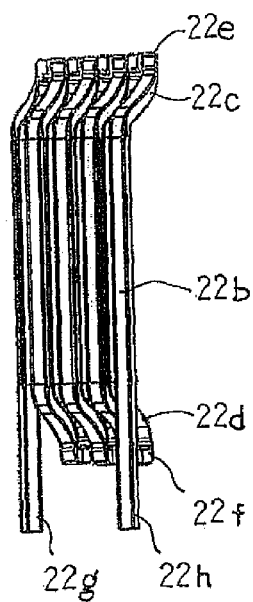
FIG. 8 is a side elevation that shows the winding body that constitutes the winding assembly in the rotary electric machine according to Embodiment 1 of the present invention.
Figure 9:
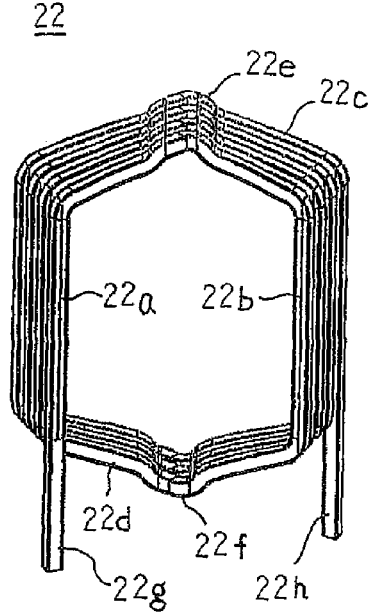
FIG. 9 is an oblique projection of the winding body that constitutes the winding assembly in the rotary electric machine according to Embodiment 1 of the present invention when viewed from obliquely above a front surface.

FIG. 1 is a half section that shows a rotary electric machine according to Embodiment 1 of the present invention, FIG. 2 is an oblique projection that shows part of the rotary electric machine according to Embodiment 1 of the present invention, FIG. 3 is an oblique projection that shows an armature that is used in the rotary electric machine according to Embodiment 1 of the present invention, FIG. 4 is an oblique projection that shows a core block that constitutes an armature that is used in the rotary electric machine according to Embodiment 1 of the present invention, FIG. 5 is an oblique projection that shows a winding assembly that constitutes an armature winding of the armature that is used in the rotary electric machine according to Embodiment 1 of the present invention, FIG. 6 is an oblique projection that shows a winding body that constitutes the winding assembly in the rotary electric machine according to Embodiment 1 of the present invention, FIG. 7 is a front elevation that shows the winding body that constitutes the winding assembly in the rotary electric machine according to Embodiment 1 of the present invention, FIG. 8 is a side elevation that shows the winding body that constitutes the winding assembly in the rotary electric machine according to Embodiment 1 of the present invention, and FIG. 9 is an oblique projection of the winding body that constitutes the winding assembly in the rotary electric machine according to Embodiment 1 of the present invention when viewed from obliquely above a front surface.

In FIGS. 1 and 2, a rotary electric machine 100 includes: a housing 1 that has: a floored cylindrical frame 2; and an end plate 3 that closes an opening of the frame 2; an armature 10 that is fixed to a cylindrical portion of the frame 2 in an internally fitted state; and a rotor 5 that is fixed to a rotating shaft 6 that is rotatably supported in the floor portion of the frame 2 and the end plate 3 by means of bearings 4 so as to be rotatably disposed on an inner circumferential side of the armature 10.

The rotor 5 is a permanent-magnet rotor that includes: a rotor core 7 that is fixed to the rotating shaft 6, which is inserted through a central position thereof; and permanent magnets 8 that are embedded near an outer circumferential surface of the rotor core 7 so as to be arranged at a predetermined pitch circumferentially to constitute magnetic poles. Moreover, the rotor 5 is not limited to a permanent-magnet rotor, and a squirrel-cage rotor in which uninsulated rotor conductors are housed in slots of a rotor core such that two sides are shorted by a shorting ring, or a wound rotor in which insulated conductor wires are mounted into slots of a rotor core, etc., may be used.

Next, configuration of the armature 10 will be explained in detail with reference to FIGS. 3 through 9.

As shown in FIG. 3, the armature 10 includes: an armature core 11; and an armature winding 20 that is mounted onto the armature core 11. Here, to facilitate explanation, the number of poles p in the rotor 5 is eight, the number of slots s in the armature core 11 is forty-eight, and the armature winding 20 is a three-phase winding. In other words, the number of slots per phase per pole q is two.

As shown in FIG. 4, core blocks 12 are made by dividing the annular armature core 11 into forty-eight equal sections circumferentially, and include: a core back portion 12a that has a circular arc-shaped cross section, that is produced by laminating and integrating a predetermined number of electromagnetic steel sheets; and a tooth 12b that is disposed so as to extend radially inward from an inner circumferential wall surface of the core back portion 12a. The armature core 11 is configured into an annular shape by arranging and integrating forty-eight core blocks 12 circumferentially by abutting together circumferential side surfaces of the core back portions 12a such that the teeth 12b are oriented radially inward. The slots 13, which are formed by circumferentially adjacent core blocks 12, are arranged at a uniform angular pitch circumferentially so as to be open on an inner circumferential side. The teeth 12b are formed so as to have a tapered shape in which a circumferential width becomes gradually narrower radially inward, and a cross section of the slots 13 that is perpendicular to a central axis of the armature core 11 is rectangular.

As shown in FIGS. 6 through 9, the winding bodies 22 are hexagonal coils that are configured by winding conductor wire that has a rectangular cross section that is made of unjointed continuous copper wire or aluminum wire that is insulated using an enamel resin, for example, for four turns helically into an approximate hexagon shape such that flat surfaces that are constituted by long sides of the rectangular cross sections face each other, and such that a gap d that is approximately equal to a length of short sides of the rectangular cross section is ensured between the facing flat surfaces in question. The winding bodies 22 are produced by winding the conductor wire for four turns helically into an edgewise winding to produce a tubular coil body, and subsequently forming the coil body into an approximate hexagon shape using a coil molding machine, for example. Alternatively, the winding bodies 22 may be produced by a folding and bending process so as to bend a conductor wire into an approximate hexagon shape while winding it helically.

The winding bodies 22 include: first and second rectilinear portions 22a and 22b that form two columns that are separated by an angular pitch of six slots in which four of each are arranged in a direction of short sides of the rectangular cross sections so as to leave gaps d in each of the columns; and first and second coil ends 22c and 22d that alternately link first longitudinal ends to each other and second longitudinal ends to each other between the columns of first and second rectilinear portions 22a and 22b. Moreover, an angular pitch of six slots is a pitch between slot centers of slots 13 on two sides of six consecutive teeth 12b, and corresponds to a pitch of one magnetic pole.

The first coil ends 22c extend outward at a predetermined inclination longitudinally outward relative to the first and second rectilinear portions 22a and 22b from first ends of first rectilinear portions 22a in a first column toward second rectilinear portions 22b in a second column, are bent approximately at right angles at central portions (first top portions 22e) between the columns of the first and second rectilinear portions 22a and 22b and displaced by a distance d in a direction of arrangement of the first and second rectilinear portions 22a and 22b, and are subsequently bent approximately at right angles and extend longitudinally inward relative to the first and second rectilinear portions 22a and 22b toward the second rectilinear portions 22b in the second column at a predetermined inclination, and are connected to first ends of the second rectilinear portion 22b in the second column.

Similarly, the second coil ends 22d extend outward at a predetermined inclination longitudinally outward relative to the first and second rectilinear portions 22a and 22b from second ends of second rectilinear portions 22b in the second column toward first rectilinear portions 22a in the first column, are bent approximately at right angles at central portions (second top portions 22f) between the columns of the first and second rectilinear portions 22a and 22b and displaced by a distance d in a direction of arrangement of the first and second rectilinear portions 22a and 22b, and are subsequently bent approximately at right angles and extend longitudinally inward relative to the first and second rectilinear portions 22a and 22b toward the first rectilinear portions 22a in the first column at a predetermined inclination, and are connected to second ends of the first rectilinear portions 22a in the first column.

In winding bodies 22 that are configured in this manner, the first and second rectilinear portions 22a and 22b, and the first and second coil ends 22c and 22d, are each arranged in the direction of the short sides of the rectangular cross sections of the conductor wire at a pitch (2d) that is approximately twice the length of the short sides such that flat surfaces that are constituted by the long sides of the rectangular cross sections of the conductor wire face each other. The first rectilinear portions 22a and the second rectilinear portions 22b, which are connected by means of the first top portions 22e and the second top portions 22f, are offset in the direction of arrangement by a distance d. The winding bodies 22 also include: a winding end 22g that extends outward in the longitudinal direction from the second end of a first rectilinear portion 22a that is positioned at a first end in the direction of arrangement in the first column; and a winding end 22h that extends outward in the longitudinal direction from the second end of a second rectilinear portion 22b that is positioned at a second end in the direction of arrangement in the second column.

As shown in FIG. 5, the winding assembly 21 is configured by arranging the winding bodies 22 circumferentially at a pitch of one slot. As shown in FIG. 3, the winding assembly 21 is mounted to the armature core 11 such that the respective winding bodies 2 that are arranged circumferentially at a pitch of one slot are housed in pairs of slots 13 that span six consecutive teeth 12b. Winding ends 22g each project axially outward, and are arranged on a radially inner side of the winding assembly 21 at a pitch of one slot circumferentially, and winding ends 22h each project axially outward, and are arranged on a radially outer side of the winding assembly 21 at a pitch of one slot circumferentially. A predetermined connection process (described below) is applied to the winding ends 22g and 22h of the winding assembly 21 to configure the armature winding 20.

Figure 10:
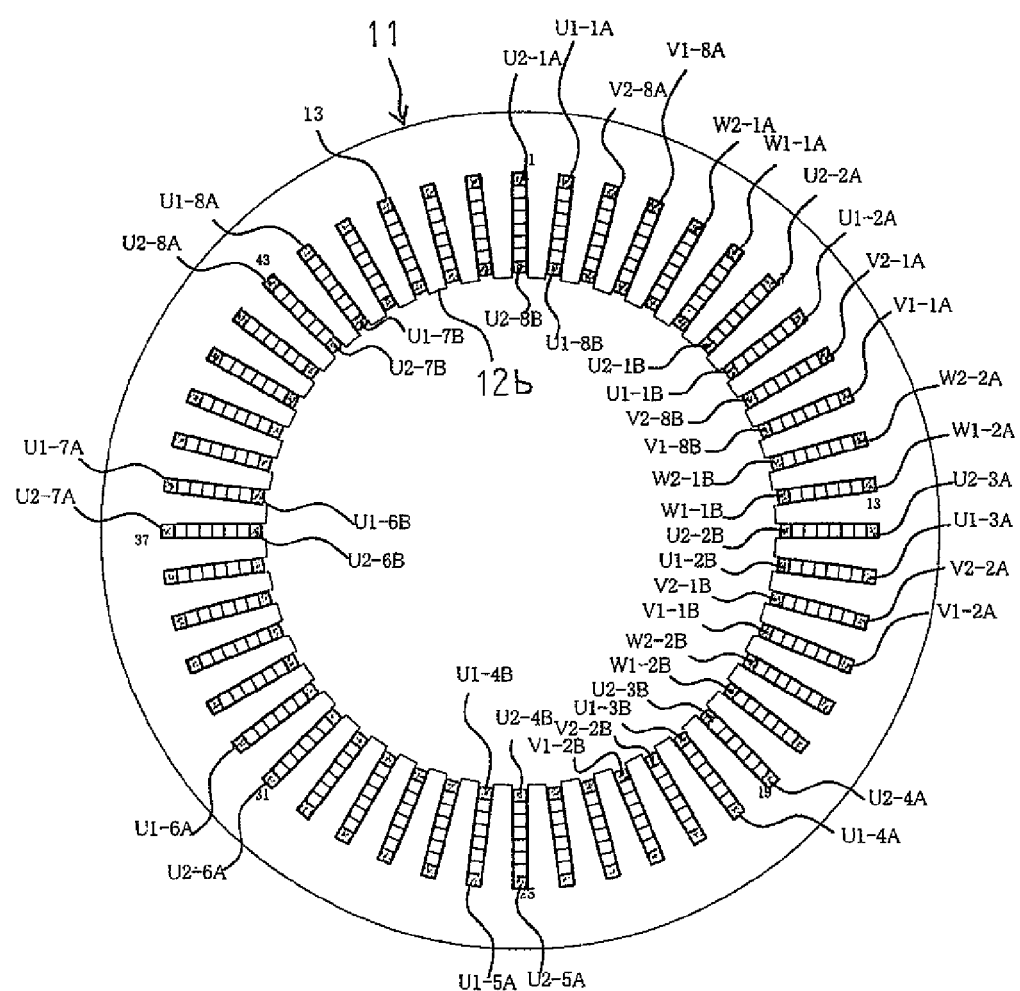
FIG. 10 is an end elevation of the armature in the rotary electric machine according to Embodiment 1 of the present invention when viewed from a side near a second axial end.
Figure 11:
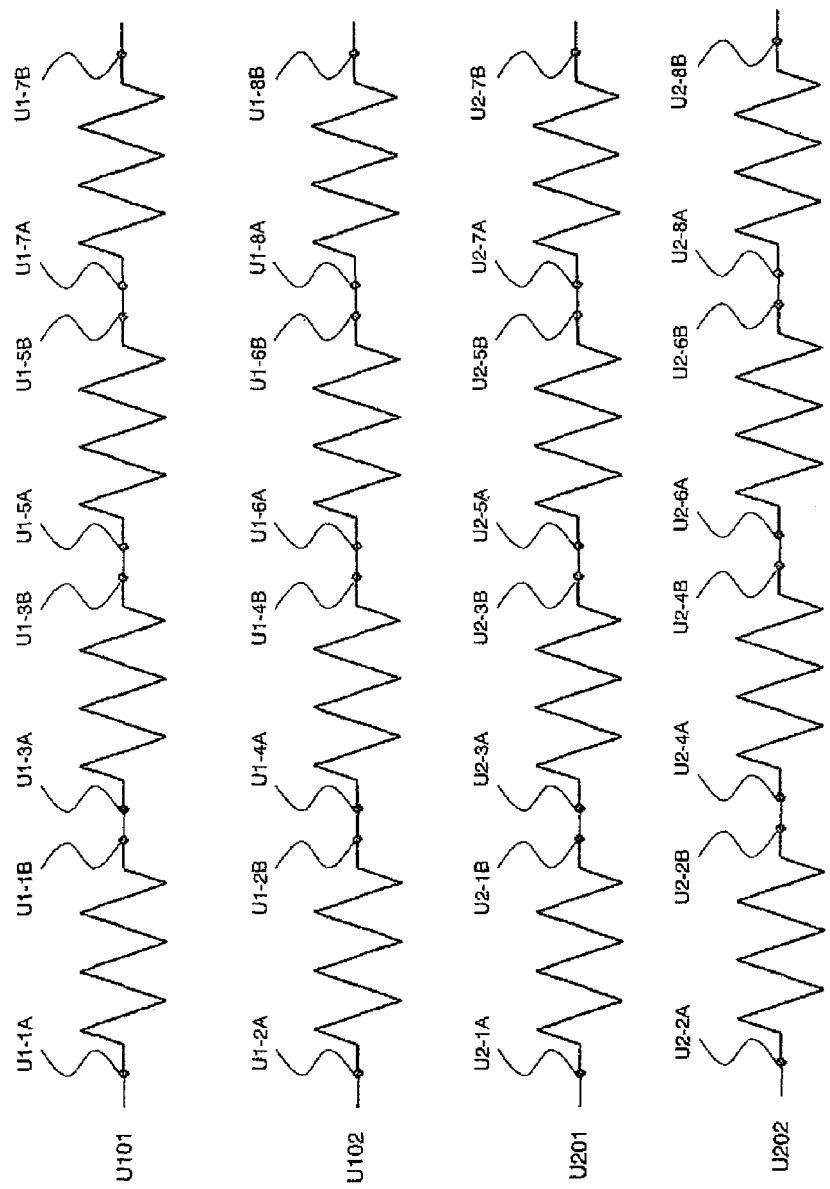
FIG. 11 is a connection diagram for small coil groups that constitute a U-phase coil of the armature winding in the rotary electric machine according to Embodiment 1 of the present invention.
Figure 12:
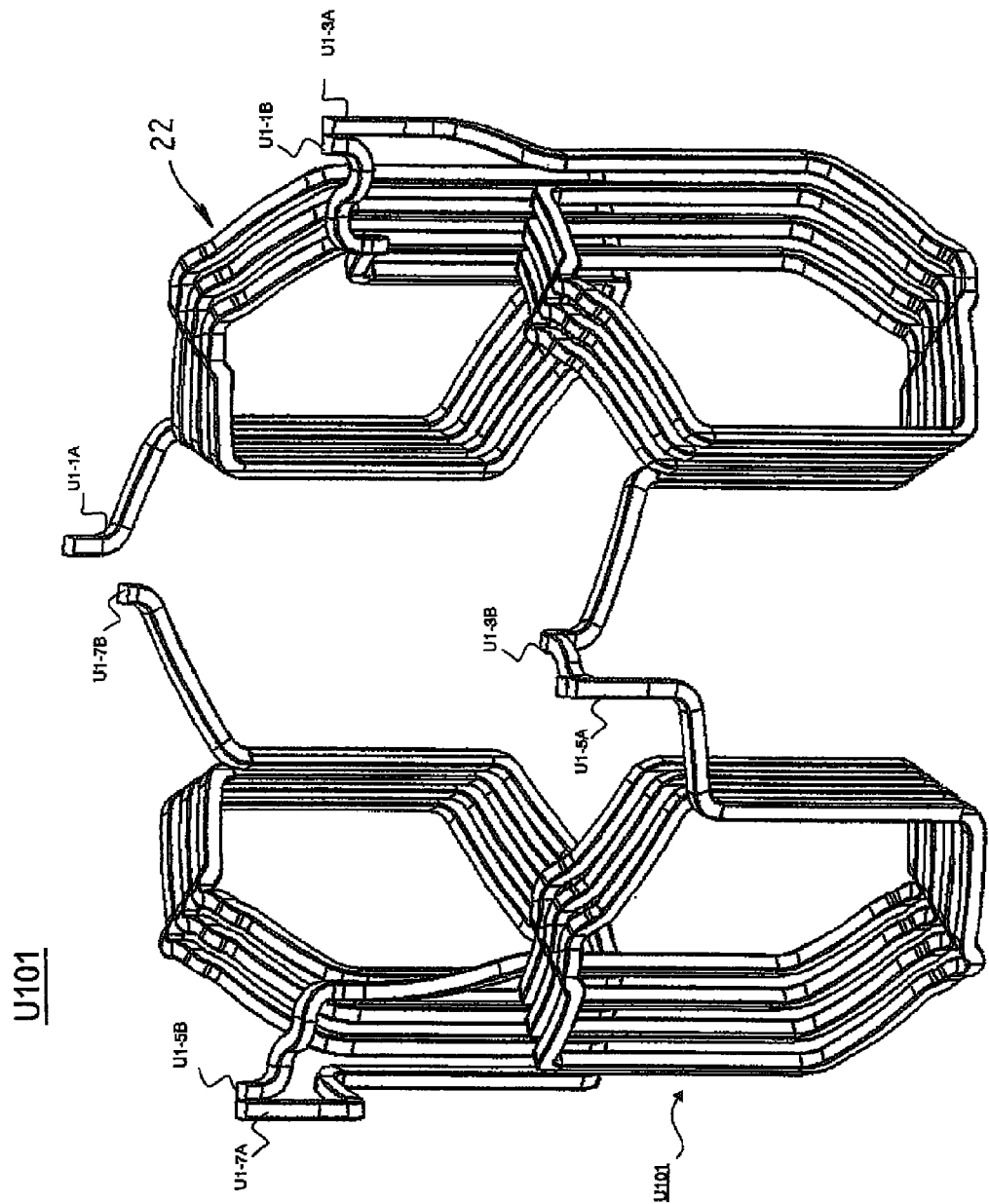
FIG. 12 is an oblique projection that shows the small coil groups that constitute the U-phase coil of the armature winding in the rotary electric machine according to Embodiment 1 of the present invention.
Figure 13:
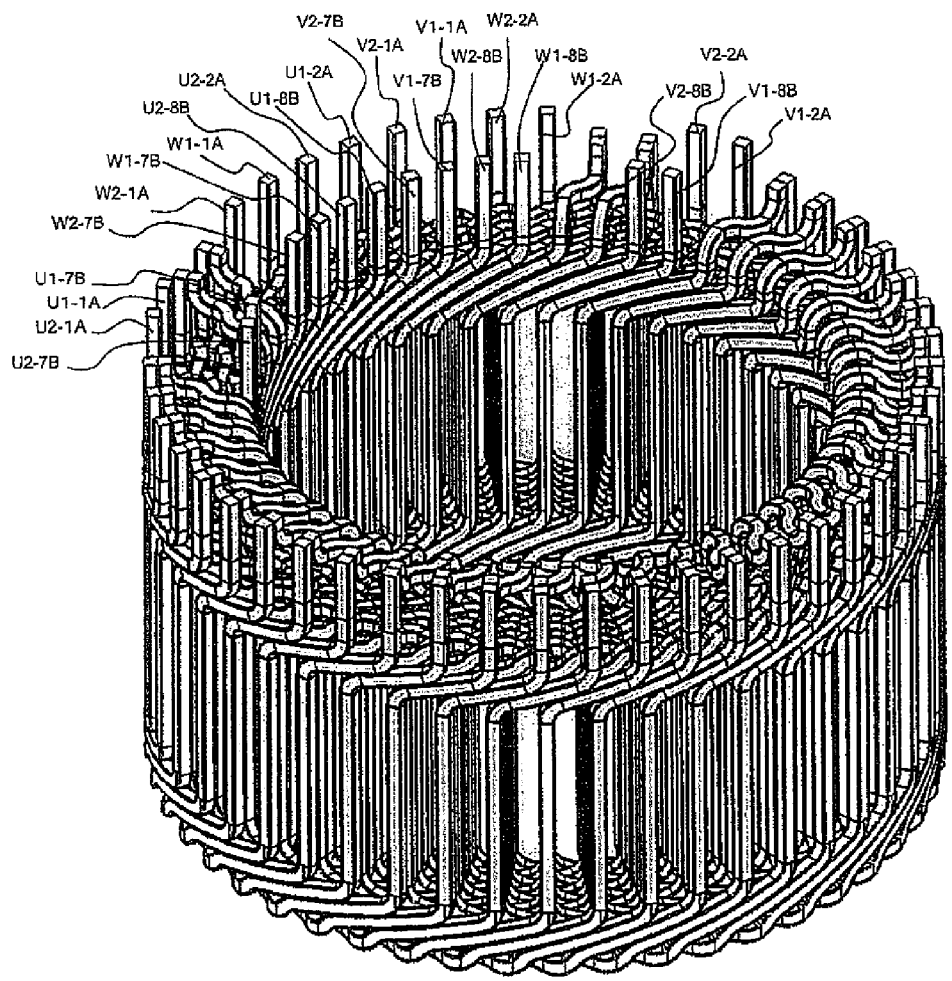
FIG. 13 is an oblique projection that shows an arranged state of small coil groups of the winding assembly in the rotary electric machine according to Embodiment 1 of the present invention.
Figure 14:
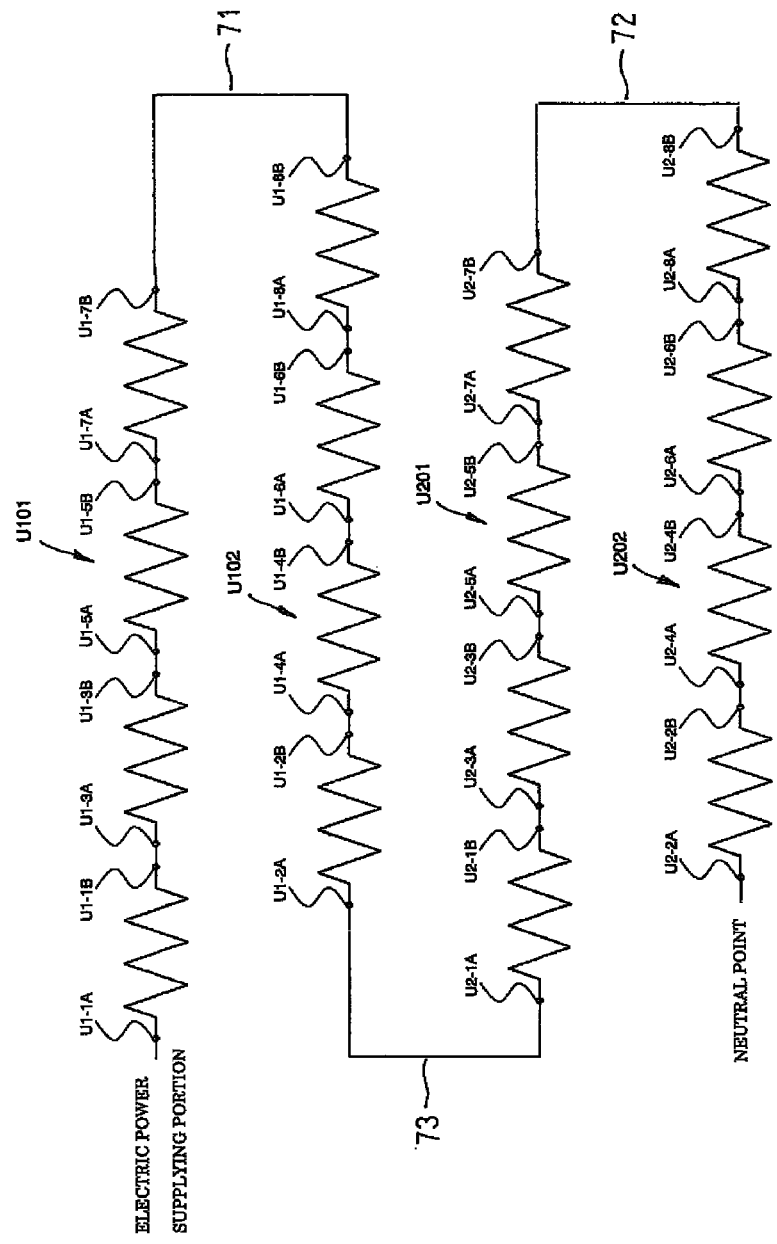
FIG. 14 is a connection diagram for the U-phase coil of the armature winding in the rotary electric machine according to Embodiment 1 of the present invention.
Figure 15:
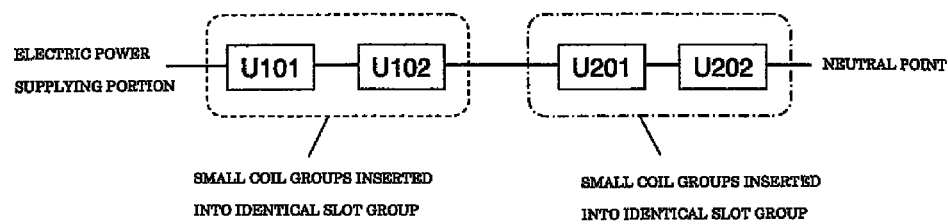
FIG. 15 is a schematic diagram that shows the U-phase coil of the armature winding in the rotary electric machine according to Embodiment 1 of the present invention.

Next, a connection method for the winding assembly 21 will be explained with reference to FIGS. 10 through 15. FIG. 10 is an end elevation of the armature in the rotary electric machine according to Embodiment 1 of the present invention when viewed from a side near a second axial end, FIG. 11 is a connection diagram for small coil groups that constitute a U-phase coil of the armature winding in the rotary electric machine according to Embodiment 1 of the present invention, FIG. 12 is an oblique projection that shows the small coil groups that constitute the U-phase coil of the armature winding in the rotary electric machine according to Embodiment 1 of the present invention, FIG. 13 is an oblique projection that shows an arranged state of small coil groups of the winding assembly in the rotary electric machine according to Embodiment 1 of the present invention, FIG. 14 is a connection diagram for the U-phase coil of the armature winding in the rotary electric machine according to Embodiment 1 of the present invention, and FIG. 15 is a schematic diagram that shows the U-phase coil of the armature winding in the rotary electric machine according to Embodiment 1 of the present invention. In FIGS. 10, 1, 7, 13, etc., through 43 are slot numbers that have been allotted to the slots 13 sequentially in a circumferential direction.

First, in FIG. 10, U1-1A, U1-2A, etc., through U1-8A and U1-1B, U1-2B, etc., through U1-8B are winding ends of winding bodies 22 that constitute a U1 phase that is mounted into a group of slots 13 at Slot Numbers (1+6n), where n is a natural number that includes 0, and U2-1A, U2-2A, etc., through U2-8A and U2-1B, U2-2B, etc., through U2-8B are winding ends of winding bodies 22 that constitute a U2 phase that is mounted into a group of slots 13 at Slot Numbers (2+6n).

Winding bodies 22 are also mounted into a slot group at Slot Numbers (3+6n) to constitute a V1 phase, and winding bodies 22 are mounted into a slot group at Slot Numbers (4+6n) to constitute a V2 phase. Winding bodies 22 are also mounted into a slot group at Slot Numbers (5+6n) to constitute a W1 phase, and winding bodies 22 are mounted into a slot group at Slot Numbers (6+6n) to constitute a W2 phase. Here, to facilitate explanation, only V1-1A, V1-2A, V1-1B, and V1-2B (winding ends of the winding bodies 22 that constitute the V1 phase), V2-1A, V2-2A, V2-1B, and V2-2B (winding ends of the winding bodies 22 that constitute the V2 phase), W1-1A, W1-2A, W1-1B, and W1-1B (winding ends of the winding bodies 22 that constitute the W1 phase), and W2-1A, W2-2A, W2-1B, and W2-2B (winding ends of the winding bodies 22 that constitute the W2 phase) are shown.

Next, a method for connecting first through fourth small coil groups U101, U102, U201, and U202 that constitute a U-phase coil will be explained based on FIG. 11.

U1-1B and U1-3A, U1-3B and U1-5A, and U1-5B and U1-7A of winding bodies 22 that are separated by 360 electrical degrees are connected to produce the first small coil group U101. Similarly, U1-2B and U1-4A, U1-4B and U1-6A, and U1-6B and U1-8A of winding bodies 22 that are separated by 360 electrical degrees are connected to produce the second small coil group U102. Similarly, U2-1B and U2-3A, U2-3B and U2-5A, and U2-5B and U2-7A of winding bodies 22 that are separated by 360 electrical degrees are connected to produce the third small coil group U201. Similarly, U2-2B and U2-4A, U2-4B and U2-6A, and U2-6B and U2-8A of winding bodies 22 that are separated by 360 electrical degrees are connected to produce the fourth small coil group U202.

As shown in FIG. 12, the first small coil group U101 is configured by connecting four winding bodies 22 that are arranged so as to be 360 electrical degrees apart in a circumferential direction in series in order of circumferential arrangement. Thus, distances between winding ends 22g and 22h of the winding bodies 22 that are connected are shorter, enabling the winding bodies 22 to be connected to each other by extending the winding ends 22g and using them as crossover portions. The second through fourth small coil group U102, U201, and U202 are also configured by connecting four winding bodies 22 that are arranged so as to be 360 electrical degrees apart in a circumferential direction in series in order of circumferential arrangement. The first through fourth small coil groups U101, U102, U201, and U202 are each revolution coils that are mounted so as to make approximately one round (360 mechanical degrees) circumferentially around the armature core 11. Although not shown, a V-phase coil and a W-phase coil are also formed in a similar or identical manner. FIG. 13 shows a state in which twelve small coil groups that are each produced by connecting four winding bodies 22 in series are arranged such that phases are offset by an electrical angle of π/6 from each other, i.e., at a pitch of one slot.

Thus, in Embodiment 1, the number of slots per phase per pole q is two, the number of poles p is eight, the number of winding bodies 22 that are housed in one slot 13 is two, and the number of small coil groups per phase (2q) is four, making the number of winding bodies 22 that constitute each of the small coil groups that are connected in series four (p/2).

Next, a method for connecting between the first through fourth small coil groups U101, U102, U201, and U202 that constitute the U-phase coil will be explained based on FIGS. 14 and 15. Moreover, because the V-phase coil and the W-phase coil are also connected in a similar manner, explanation thereof will be omitted here.

The first small coil group U101 and the second small coil group U102 are housed in a slot group at Slot Numbers (1+6n), and the third small coil group U201 and the fourth small coil group U202 are housed in a slot group at Slot Numbers (2+6n). The first small coil group U101 and the second small coil group U102 are connected in series by connecting U1-7B and U1-8B using a crossover wire 71. The third small coil group U201 and the fourth small coil group U202 are connected in series by connecting U2-7B and U2-8B using a crossover wire 72. In addition, the first through fourth small coil groups U101, U102, U201, and U202 are connected in series by connecting U1-2A and U2-1A using a crossover wire 73, to produce the U-phase coil.

In other words, the first small coil group U101 and the second small coil group U102, which are housed in an identical slot group, are linked by connecting together winding bodies 22 that are inserted into slots 13 that are separated by an electrical angle of n using the crossover wire 71. The third small coil group U201 and the fourth small coil group U202, which are housed in an identical slot group, are linked by connecting together winding bodies 22 that are inserted into slots 13 that are separated by an electrical angle of n using the crossover wire 72. In addition, the first and second small coil groups U101 and U102 and the third and fourth small coil groups U201 and U202 are linked by connecting together winding bodies 22 that are housed in slots 13 that are separated by an electrical angle of (π+π/6) using the crossover wire 73. A U-phase coil in which sixteen winding bodies 22 are connected in series is produced thereby.

Here, due to constraints on manufacturing conditions, the U-phase coil may be produced by connecting U1-1A and U1-2A using the crossover wire 71, connecting U2-1A and U2-2A using the crossover wire 72, and connecting U1-8B and U2-7B using the crossover wire 73. The crossover wires 71, 72, and 73 are made using a conductor sheet made of copper, etc., and extend circumferentially so as to be electrically insulated from each other axially outside the second coil ends 22d of the forty-eight winding bodies 22 that are mounted into the armature core 11 so as to be arranged at a pitch of one slot circumferentially.

The U-phase coil, the V-phase coil, and the W-phase coil that are produced in this manner are multi-layer winding constructions in which two small coil groups are housed in one slot 13. The armature winding 20 is obtained by wye-connecting the U-phase coil, the V-phase coil, and the W-phase coil. This armature winding 20 constitutes a three-phase alternating-current winding that is a distributed winding of full-pitch windings. Moreover, "distributed windings" are windings that are configured by winding conductor wires into slots that are separated by greater than or equal to two slots. In other words, distributed windings are windings that are wound such that a conductor wire that extends outward from one slot spans two or more consecutive teeth and enters another slot.

A rotary electric machine 100 that uses the armature winding 20 that is connected in this manner operates as an eight-pole forty-eight-slot inner-rotor three-phase motor when predetermined alternating-current power is supplied to the armature winding 20.

Moreover, insulation between the weld portions of the first and second winding ends 22g and 22h of the winding bodies 22 is not described at all, but an electrically insulating resin should be applied to the weld portions, for example.

In the rotary electric machine 100 that is configured in this manner, because the small coil groups that constitute each of the phase coils are each configured by connecting four winding bodies 22 that are arranged so as to be 360 electrical degrees apart in a circumferential direction in series in order of circumferential arrangement, lengths of the crossover portions that connect the winding bodies 22 together can be shortened. Thus, downsizing can be achieved without enlarging the coil ends axially as in conventional rotary electric machines such as that described in Patent Literature 2. Because the lengths of the crossover portions that connect the winding bodies 22 together are shorter, resistance in each of the phase coils that constitute the armature winding 20 also decreases, enabling increased efficiency.

The phase coils are configured by connecting four small coil groups in series. Here, because two small coil groups that are housed in an identical slot group are connected consecutively, electric potential differences that arise between the conductor wires inside the slots 13 can be reduced. As a result, because insulating material between the conductor wires inside the slots 13, such as the thickness of the insulating coating that is coated onto the conductor wire, for example, can be made thinner, cross-sectional area of the conductor portion of the conductor wire can be increased proportionately to increase space factor, enabling increased efficiency and improvements in heat radiating characteristics to be expected.

Because the small coil groups are linked together by crossover wires 71, 72, and 73 that extend in a circumferential direction axially outside the second coil ends 22d, increases in the diameter of the armature winding 20 can be suppressed. Because connection of the small coil groups can be changed simply by modifying the shapes and positions of the conductor sheets that constitute the crossover wires 71, 72, and 73, design modifications to the armature winding 20 can be accommodated simply.

Moreover, in Embodiment 1, it has been possible to confirm that electric potential differences between the conductor wires inside the slots 13 can be suppressed to a maximum of 48.4 percent of the inter-phase voltages. To find this electric potential difference, voltage drop that arises in a single turn of the winding bodies 22 was calculated, the electric potential difference that arises in conductor wires that are housed inside an identical slot 13 was calculated and compared in all of the slots 13, and the maximum electric potential difference was used.

Figure 16:
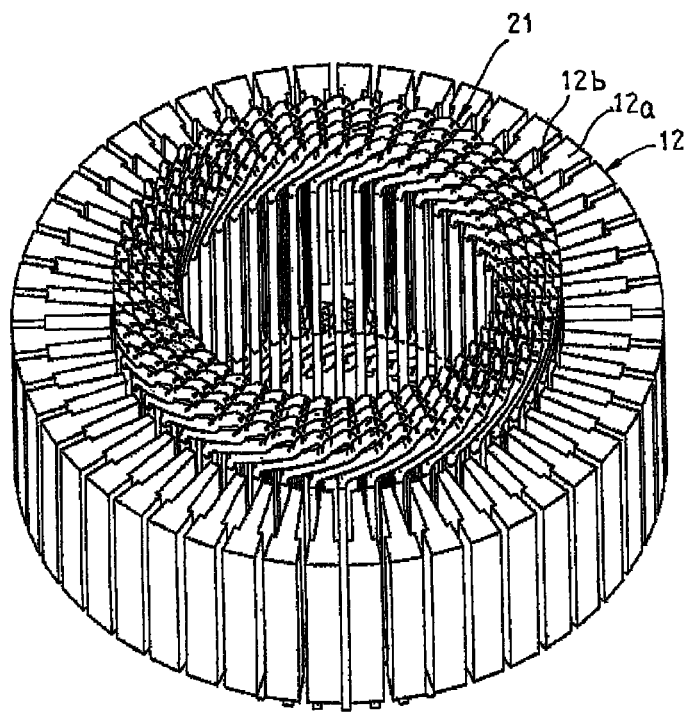
FIG. 16 is a diagram that explains a method for assembling the armature in the rotary electric machine according to Embodiment 1 of the present invention.
Figure 17:
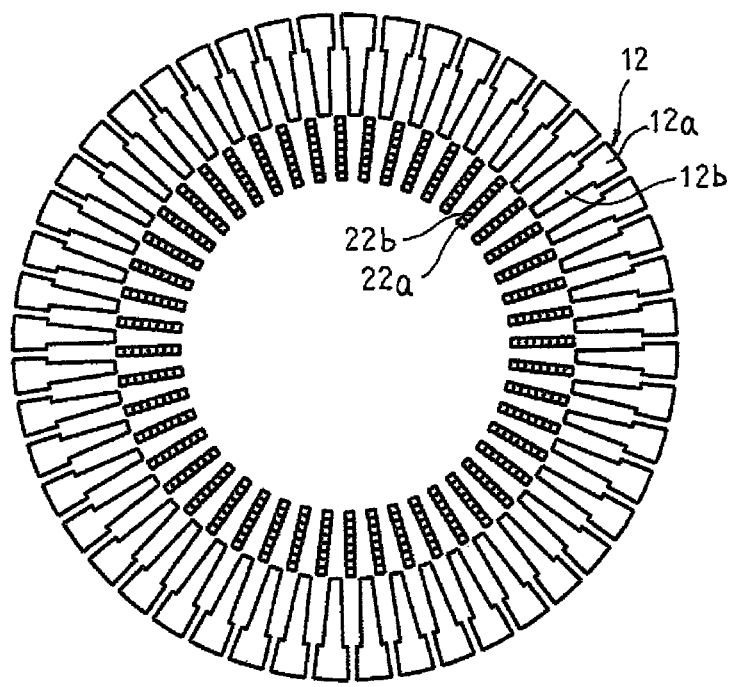
FIG. 17 is a diagram that explains the method for assembling the armature in the rotary electric machine according to Embodiment 1 of the present invention.
Figure 18:
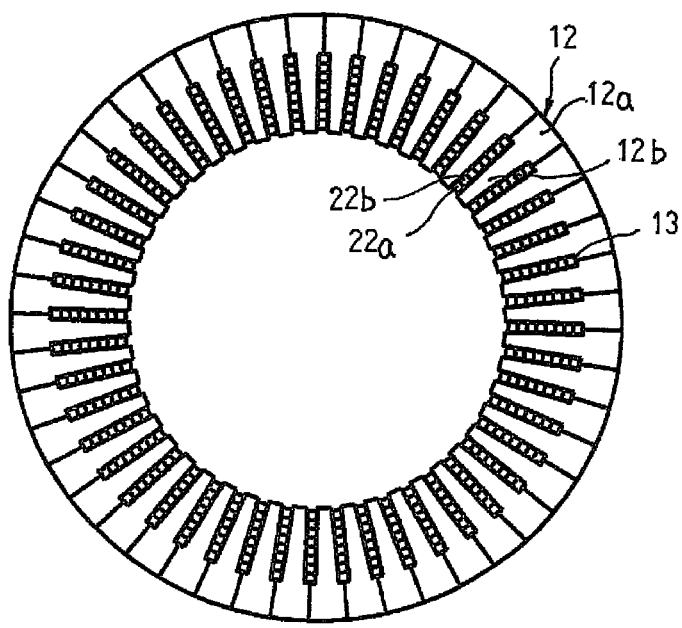
FIG. 18 is a diagram that explains the method for assembling the armature in the rotary electric machine according to Embodiment 1 of the present invention.
Figure 19:
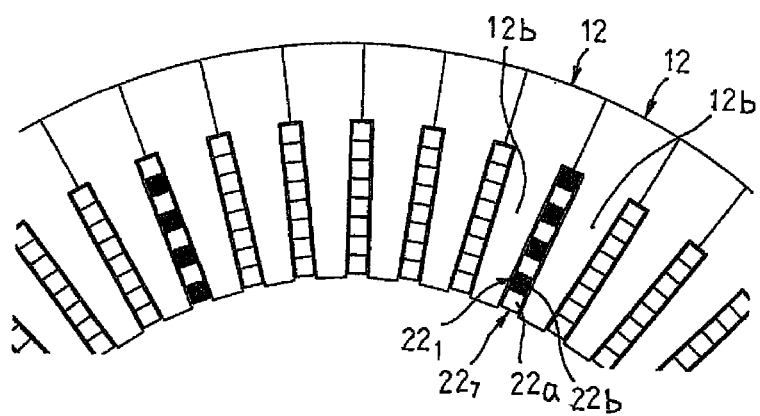
FIG. 19 is a diagram that explains the method for assembling the armature in the rotary electric machine according to Embodiment 1 of the present invention.

Next, a method for assembling the armature 10 will be explained with reference to FIGS. 16 through 19. FIGS. 16 through 19 are diagrams that explain a method for assembling the armature in the rotary electric machine according to Embodiment 1 of the present invention, FIGS. 16 and 17 showing a state before assembly of the armature, FIG. 18 showing a state after assembly of the armature, and FIG. 19 showing the state after assembly of the armature enlarged. Moreover, for simplicity, only the first and second rectilinear portions 22a and 22b of the winding assembly 21 are shown in FIGS. 17 through 19.

First, forty-eight columns of eight first and second rectilinear portions 22a and 22b are arranged into a winding assembly 21 at an approximately uniform angular pitch.

Next, forty-eight core blocks 12 are arranged at an approximately uniform angular pitch circumferentially such that respective teeth are positioned on a radially outer side between adjacent columns of first and second rectilinear portions 22a and 22b of the winding assembly 21, as shown in FIGS. 16 and 17. Next, the core blocks 12 that are arranged circumferentially are simultaneously moved radially inward. The respective teeth 12b of the core blocks 12 are thereby inserted between the adjacent columns of first and second rectilinear portions 22a and 22b, and the circumferential side surfaces of the adjacent core blocks 12 are abutted with each other, preventing radially inward movement of the core blocks 12, and the winding assembly 21 is thereby mounted onto the armature core 11, as shown in FIGS. 18 and 19. Inside each of the slots 13, eight first and second rectilinear portions 22a and 22b are housed such that the long sides of the rectangular cross sections are oriented circumferentially so as to line up neatly in a single column in a radial direction.

Thus, by moving the core blocks 12 that are arranged in a row circumferentially radially inward so as to be inserted into the winding assembly 21, the first and second rectilinear portions 22a and 22b that are lined up irregularly in the radial direction are arranged neatly in a column by the movement that narrows the spacing between the teeth 12b of the adjacent core blocks 12. In addition, gaps between each of the first and second rectilinear portions 22a and 22b that are arranged neatly in a column in the radial direction are reduced and eliminated by the radially inward movement of the core back portions 12a of the core blocks 12. Thus, space factor of the conductor wires inside the slots 13 can be improved. Because the conductor wires inside the slots 13 and the core blocks 12 are in contact with each other, and heat transfer performance from the winding assembly 21, which constitutes a heat-generating body during passage of electric current, to the armature core 11 can be improved, temperature increases in the winding assembly 21 are suppressed, enabling increases in electrical resistance to be suppressed. Because the core blocks 12 are inserted such that the spacing between the adjacent teeth 12b becomes gradually narrower, sliding movement at contact surfaces between the armature winding 20 and the core blocks 12 is suppressed, enabling damage to insulating coatings of the conductor wires to be prevented.

Winding bodies 22 are configured such that first and second coil ends 22c and 22d are shifted at first and second top portions 22e and 22f in a radial direction by a gap d that is approximately equal to radial dimensions of the first and second rectilinear portions 22a and 22b. Thus, one winding body 22 can be mounted to another winding body 22 without interference by aligning the axial height positions and moving it toward the other winding body 22 circumferentially, enabling assembly of the winding assembly 21 to be improved.

In a step of inserting the teeth 12b of the core blocks 12 between the first and second rectilinear portions 22a and 22b from an outer circumferential side of the winding assembly 21, because tapered teeth 12b are inserted between each of the columns of first and second rectilinear portions 22a and 22b from radially outside and moved radially inward, the armature 10 is assembled such that the first and second rectilinear portions 22a and 22b are arranged neatly into single columns.

Embodiment 2

Figure 20:
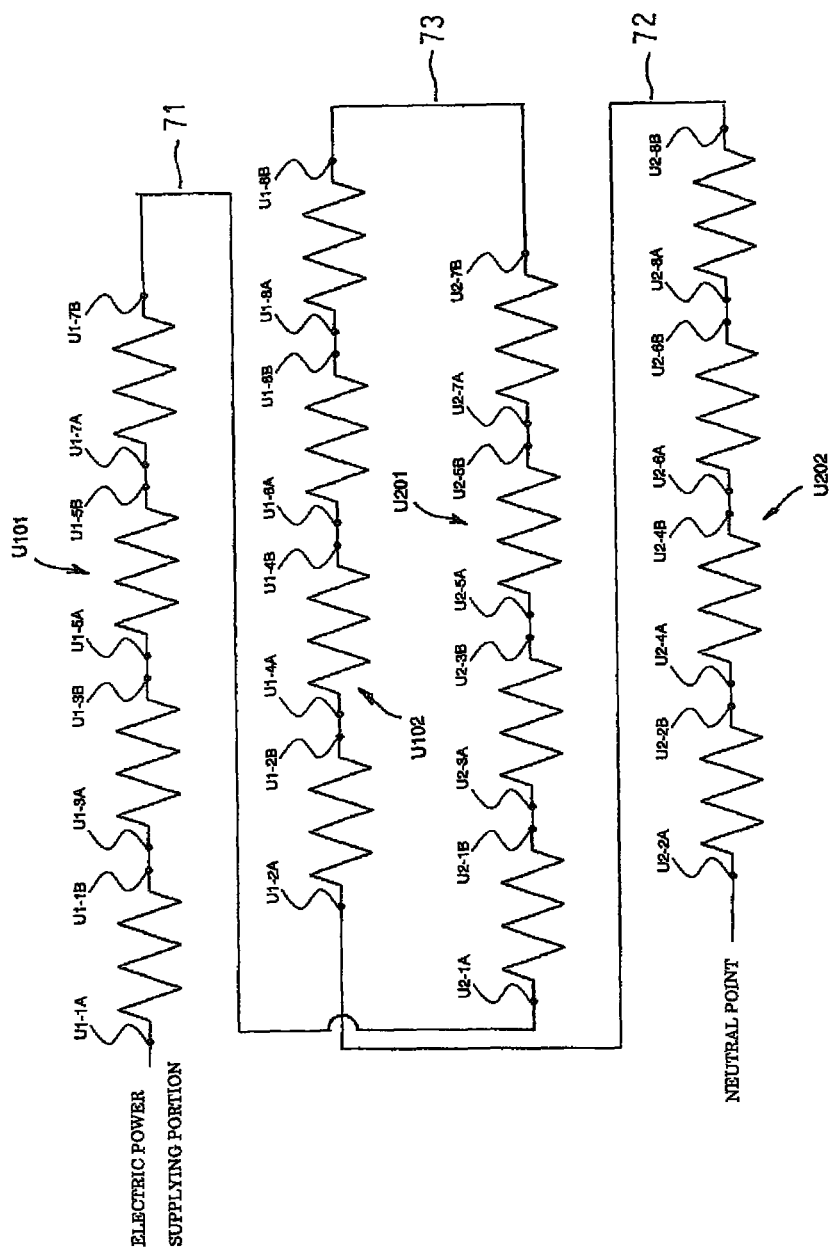
FIG. 20 is a connection diagram for a U-phase coil of an armature winding in a rotary electric machine according to Embodiment 2 of the present invention.
Figure 21:
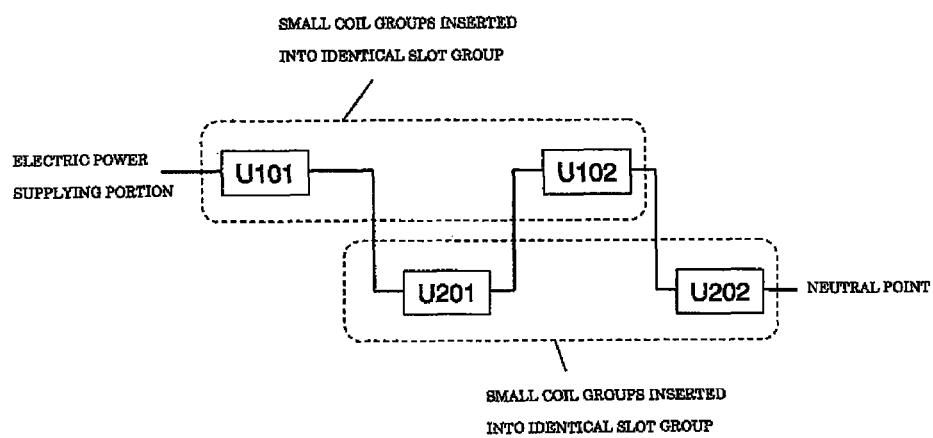
FIG. 21 is a schematic diagram that shows the U-phase coil of the armature winding in the rotary electric machine according to Embodiment 2 of the present invention.
Figure 22:
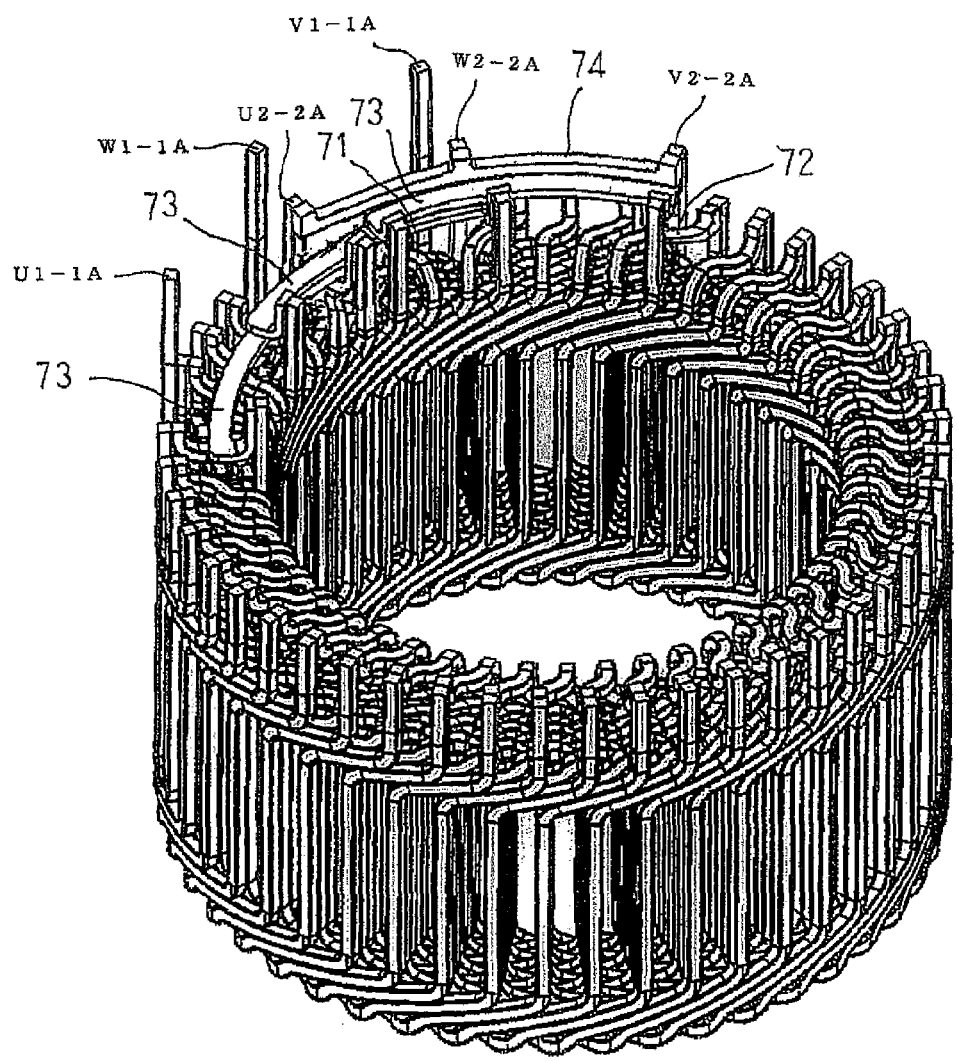
FIG. 22 is an oblique projection that shows the armature winding in the rotary electric machine according to Embodiment 2 of the present invention.

FIG. 20 is a connection diagram for a U-phase coil of an armature winding in a rotary electric machine according to Embodiment 2 of the present invention, FIG. 21 is a schematic diagram that shows the U-phase coil of the armature winding in the rotary electric machine according to Embodiment 2 of the present invention, and FIG. 22 is an oblique projection that shows the armature winding in the rotary electric machine according to Embodiment 2 of the present invention.

In Embodiment 2, a first small coil group U101, a second small coil group U102, a third small coil group U201, and a fourth small coil group U202 are configured in a similar or identical manner to those of Embodiment 1 above. As shown in FIG. 20, the first small coil group U101 and the third small coil group U201 are linked in series by connecting U1-7B and U2-1A using a crossover wire 71. Similarly, the second small coil group U102 and the fourth small coil group U202 are linked in series by connecting U1-2A and U2-8B using a crossover wire 72. U1-8B and U2-7B are also connected using a crossover wire 73. A U-phase coil that is connected sequentially in order of the first small coil group U101, the third small coil group U201, the second small coil group U102, and the fourth small coil group U202 when viewed from the electric power supplying end is obtained thereby. As shown in FIG. 21, this U-phase coil is configured by alternately connecting small coil groups that are housed in identical slot groups.

In the U-phase coil that is configured in this manner, the first small coil group U101 and the third small coil group U201 are linked in series and the second small coil group U102 and the fourth small coil group U202 are linked in series using the crossover wires 71 and 72 without modifying the conductor wires of the winding bodies 22.

In addition, the V-phase coil and the W-phase coil are formed in a similar or identical manner. As shown in FIG. 22, U2-2A of the U-phase coil, V2-2A of the V-phase coil, and W2-2A of the W-phase coil are connected by a neutral point crossover wire 74. An armature winding 20A is thereby obtained that is constituted by a three-phase alternating-current winding that is a distributed winding of full-pitch windings that is formed by wye-connecting a U-phase coil, a V-phase coil, and a W-phase coil in each of which sixteen winding bodies 22 are connected in series.

In Embodiment 2, because the small coil groups (revolution coils) that constitute each of the phase coils are each configured by connecting four winding bodies 22 that are arranged so as to be 360 electrical degrees apart in a circumferential direction in series in order of circumferential arrangement, lengths of the crossover portions that connect the winding bodies 22 together can also be shortened, enabling downsizing to be achieved.

The phase coils are configured by connecting four small coil groups in series. Here, because two small coil groups that are housed in an identical slot group are connected alternately, electric potential differences that arise between the conductor wires inside the slots 13 can be reduced. As a result, because insulating material between the conductor wires inside the slots 13, such as the thickness of the insulating coating that is coated onto the conductor wire, for example, can be made thinner, cross-sectional area of the conductor portion of the conductor wire can be increased proportionately to increase space factor, enabling increased efficiency and improvements in heat radiating characteristics to be expected.

Moreover, in Embodiment 1, it has been possible to confirm that electric potential differences between the conductor wires inside the slots 13 can be suppressed to a maximum of 73.4 percent of the inter-phase voltages. To find this electric potential difference, voltage drop that arises in a single turn of the winding bodies 22 was calculated, the electric potential difference that arises in conductor wires that are housed inside an identical slot 13 was calculated and compared in all of the slots 13, and the maximum electric potential difference was used.

The neutral point crossover wire 74 is made using a conductor sheet made of copper, etc., and extends circumferentially so as to be electrically insulated from the crossover wires 71, 72, and 73 axially outside the second coil ends 22d of the forty-eight winding bodies 22 that are mounted into the armature core 11 so as to be arranged at a pitch of one slot circumferentially.

Embodiment 3

Figure 23:
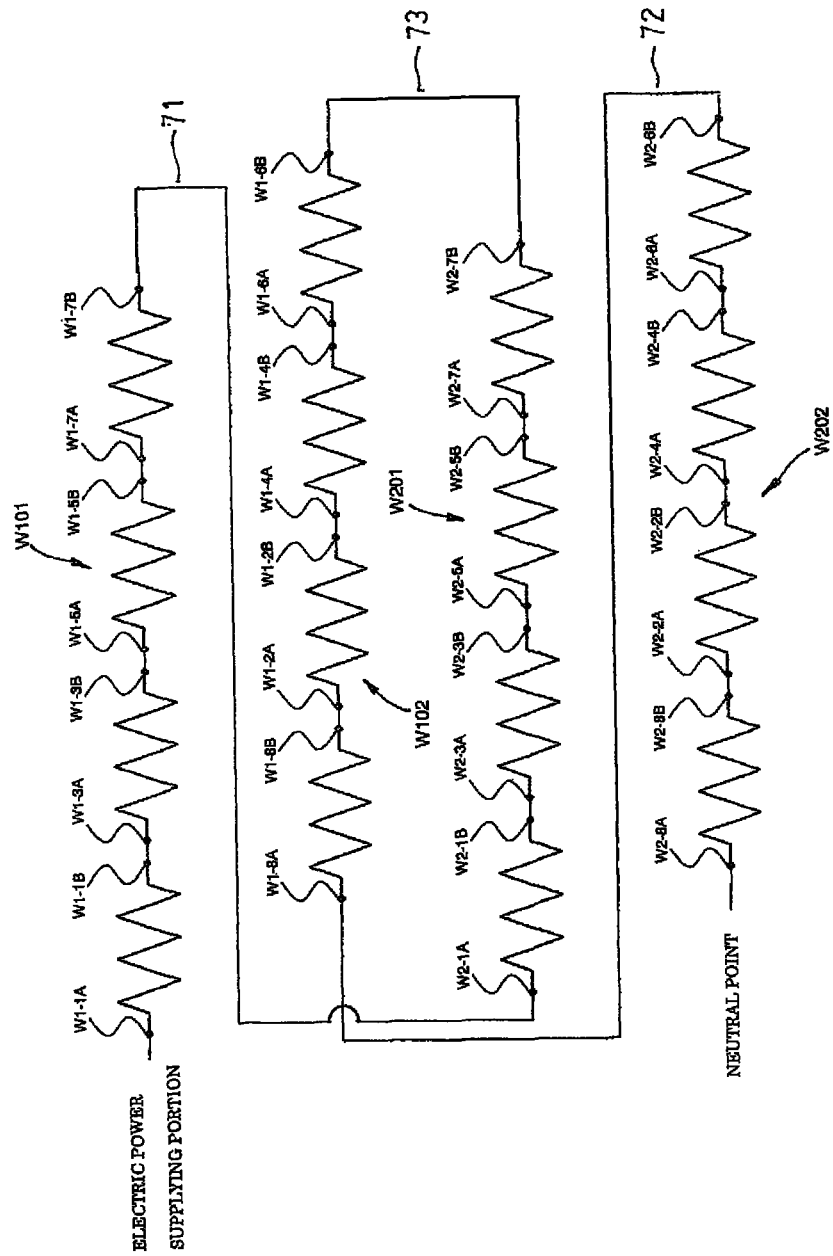
FIG. 23 is a connection diagram for a W-phase coil of an armature winding in a rotary electric machine according to Embodiment 3 of the present invention.
Figure 24:
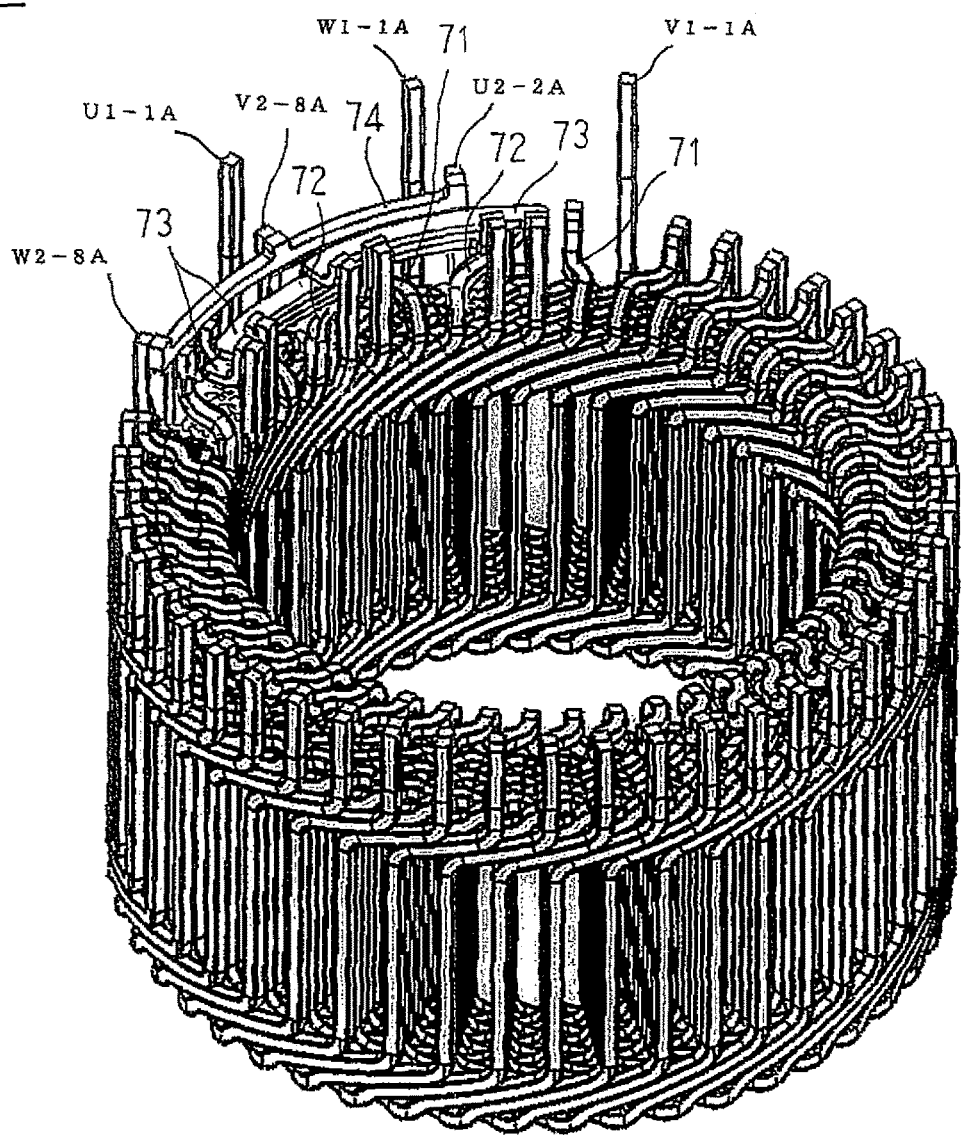
FIG. 24 is an oblique projection that shows the armature winding in the rotary electric machine according to Embodiment 3 of the present invention.

FIG. 23 is a connection diagram for a W-phase coil of an armature winding in a rotary electric machine according to Embodiment 3 of the present invention, and FIG. 24 is an oblique projection that shows the armature winding in the rotary electric machine according to Embodiment 3 of the present invention.

In Embodiment 3, as shown in FIG. 23, W1-1B and W1-3A, W1-3B and W1-5A, W1-5B and W1-7A of winding bodies 22 that are separated by 360 electrical degrees are connected to produce the first small coil group W101. Similarly, W1-8B and W1-2A, W1-2B and W1-4A, W1-4B and W1-6A of winding bodies 22 that are separated by 360 electrical degrees are connected to produce the second small coil group W102. Similarly, W2-1B and W2-3A, W2-3B and W2-5A, W2-5B and W2-7A of winding bodies 22 that are separated by 360 electrical degrees are connected to produce the third small coil group W201. Similarly, W2-8B and W2-2A, W2-2B and W2-4A, W2-4B and W2-6A of winding bodies 22 that are separated by 360 electrical degrees are connected to produce the fourth small coil group W202.

Next, the first small coil group W101 and the third small coil group W201 are linked in series by connecting W1-7B and W2-1A using a crossover wire 71. Similarly, the second small coil group W102 and the fourth small coil group W202 are linked in series by connecting W1-8A and W2-6B using a crossover wire 72. W1-6B and W2-7B are also connected using a crossover wire 73. A W-phase coil that is connected sequentially in order of the first small coil group W101, the third small coil group W201, the second small coil group W102, and the fourth small coil group W202 when viewed from the electric power supplying end is obtained thereby. This W-phase coil is configured by connecting small coil groups that are housed in an identical slot group that are one apart.

In the W-phase coil that is configured in this manner, the first small coil group W101 and the third small coil group W201 are linked in series and the second small coil group W102 and the fourth small coil group W202 are linked in series using the crossover wires 71 and 72 without modifying the conductor wires of the winding bodies 22.

A V-phase coil is also configured in a similar or identical manner to that of the W-phase coil above. A U-phase coil, on the other hand, is formed in a similar or identical manner to that of Embodiment 2 above. As shown in FIG. 24, U2-2A of the U-phase coil, V2-8A of the V-phase coil, and W2-8A of the W-phase coil are connected by a neutral point crossover wire 74. An armature winding 20B is thereby obtained that is constituted by a three-phase alternating-current winding that is a distributed winding of full-pitch windings that is formed by wye-connecting a U-phase coil, a V-phase coil, and a W-phase coil in each of which sixteen winding bodies 22 are connected in series.

In a rotary electric machine that uses an armature winding 20B that is connected in this manner, terminals of the small coil groups (the revolution coils) are concentrated in a circumferential direction, enabling further reductions in size to be achieved.

In Embodiment 3, because the small coil groups that constitute each of the phase coils are each configured by connecting four winding bodies 22 that are arranged so as to be 360 electrical degrees apart in a circumferential direction in series in order of circumferential arrangement, lengths of the crossover portions that connect the winding bodies 22 together can also be shortened, enabling downsizing to be achieved.

The phase coils are configured by connecting four small coil groups in series. Here, because every second pair of small coil groups that are housed in an identical slot group are connected, electric potential differences that arise between the conductor wires inside the slots 13 can be reduced. As a result, because insulating material between the conductor wires inside the slots 13, such as the thickness of the insulating coating that is coated onto the conductor wire, for example, can be made thinner, cross-sectional area of the conductor portion of the conductor wire can be increased proportionately to increase space factor, enabling increased efficiency and improvements in heat radiating characteristics to be expected.

Embodiment 4

Figure 25:
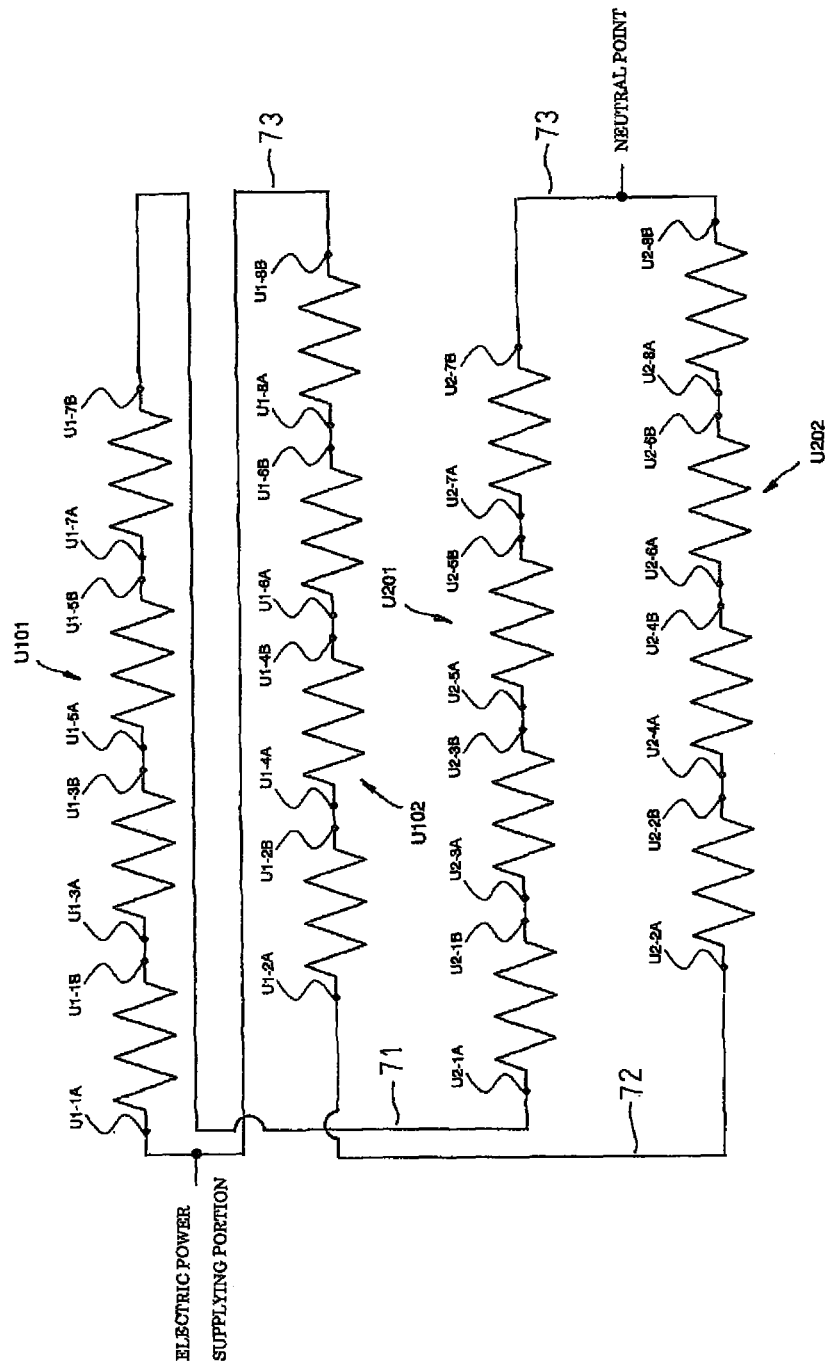
FIG. 25 is a connection diagram for a U-phase coil of an armature winding in a rotary electric machine according to Embodiment 4 of the present invention.
Figure 26:
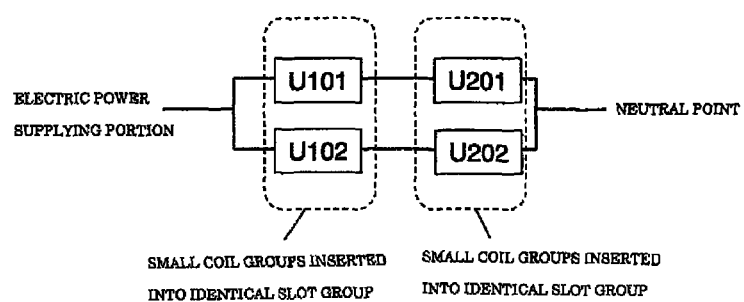
FIG. 26 is a schematic diagram that shows the U-phase coil of the armature winding in the rotary electric machine according to Embodiment 4 of the present invention.

FIG. 25 is a connection diagram for a U-phase coil of an armature winding in a rotary electric machine according to Embodiment 4 of the present invention, and FIG. 26 is a schematic diagram that shows the U-phase coil of the armature winding in the rotary electric machine according to Embodiment 4 of the present invention.

In Embodiment 4, a first small coil group U101, a second small coil group U102, a third small coil group U201, and a fourth small coil group U202 are configured in a similar or identical manner to those of Embodiment 1 above. The first small coil group U101 and the third small coil group U201 are linked in series by connecting U1-7B and U2-1A of winding bodies 22 that are inserted into slots 13 that are separated by an electrical angle of $(\pi - \pi/6)$ using a crossover wire 71. Similarly, the second small coil group U102 and the fourth small coil group U202 are linked in series by connecting U1-2A and U2-2A of winding bodies 22 that are inserted into slots 13 that are separated by an electrical angle of $(\pi/6)$ using a crossover wire 72.

In addition, U1-1A and U1-8B are connected using a crossover wire 73, and U2-7B and U2-8B are connected using a crossover wire 73. A U-phase coil that is formed by connecting in parallel two sub-coils in which eight winding bodies 22 are connected in series is produced thereby. In each of the sub-coils that are connected in parallel in this U-phase coil, two small coil groups that are housed in an identical slot group are connected at positions that have identical order when viewed from the electric power supplying end. In other words, the first small coil group U101 and the second small coil group U102, which are housed in an identical slot group, are connected so as to be in a first position from the electric power supplying end of each of the parallel-connected sub-coils. Similarly, the third small coil group U201 and the fourth small coil group U202, which are housed in an identical slot group, are connected so as to be in a second position from the electric power supplying end of each of the parallel-connected sub-coils.

A V-phase coil and a W-phase coil are also formed in a similar or identical manner to that of the U-phase coil. An armature winding is thereby obtained that is constituted by a three-phase alternating-current winding that is a distributed winding of full-pitch windings by wye-connecting a U-phase coil, a V-phase coil, and a W-phase coil.

In Embodiment 4, because the small coil groups (revolution coils) that constitute each of the phase coils are each configured by connecting four winding bodies 22 that are arranged so as to be 360 electrical degrees apart in a circumferential direction in series in order of circumferential arrangement, lengths of the crossover portions that connect the winding bodies 22 together can also be shortened.

The phase coils are configured by connecting in parallel two sub-coils that are produced by connecting in series one small coil group that is housed in a first slot group and one small coil group that is housed in a second slot group. Here, because small coil groups that are housed in an identical slot group are connected so as to be at positions that have identical order when viewed from the electric power supplying end in each of the sub-coils that is connected in parallel, electric potential differences that arise between the conductor wires inside the slots 13 can be reduced. As a result, because insulating material between the conductor wires inside the slots 13, such as the thickness of the insulating coating that is coated onto the conductor wire, for example, can be made thinner, cross-sectional area of the conductor portion of the conductor wire can be increased proportionately to increase space factor, enabling increased efficiency and improvements in heat radiating characteristics to be expected.

Moreover, in Embodiment 4, it has been possible to confirm that electric potential differences between the conductor wires inside the slots 13 can be suppressed to a maximum of 46.9 percent of the inter-phase voltages. To find this electric potential difference, voltage drop that arises in a single turn of the winding bodies 22 was calculated, the electric potential difference that arises in conductor wires that are housed inside an identical slot 13 was calculated and compared in all of the slots 13, and the maximum electric potential difference was used.

Embodiment 5

Figure 27:
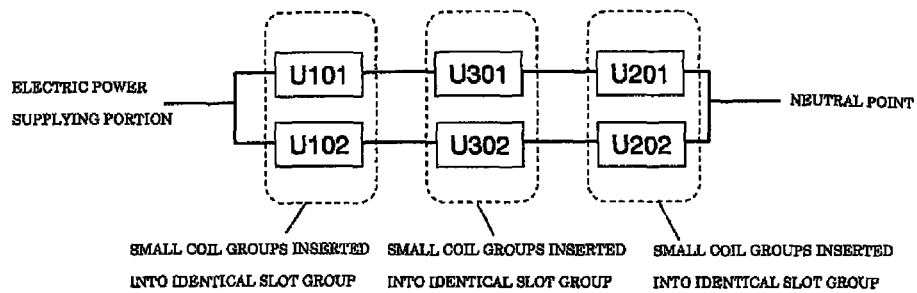
FIG. 27 is a schematic diagram that shows a U-phase coil of an armature winding in a rotary electric machine according to Embodiment 5 of the present invention.

FIG. 27 is a schematic diagram that shows a U-phase coil of an armature winding in a rotary electric machine according to Embodiment 5 of the present invention.

In Embodiment 5, the number of slots per phase per pole q is three, the number of poles p is eight, the number of slots s is seventy-two, and the number of winding bodies 22 that are housed in one slot 13 is two. Thus, the number of small coil groups per phase (2q) is six, and the number of winding bodies 22 that are connected in series to constitute each of the small coil groups (p/2) is four. The winding bodies 22 are configured by winding conductor wires into pairs of slots that are positioned on two sides of nine circumferentially consecutive teeth, i.e., into pairs of slots that are separated by a pitch of one magnetic pole.

A first small coil group U101 and a second small coil group U102 are each formed by connecting in series four winding bodies 22 that are housed in an identical slot group, and are revolution coils that are mounted so as to make approximately one round (360 mechanical degrees) circumferentially around an armature core. A third small coil group U201 and a fourth small coil group U202 are each formed by connecting in series four winding bodies 22 that are housed in a slot group that is adjacent on a first circumferential side of the slot group in which the first small coil group U101 and the second small coil group U102 are housed, and are revolution coils that are mounted so as to make approximately one round (360 mechanical degrees) circumferentially around the armature core. A fifth small coil group U301 and a sixth small coil group U302 are each formed by connecting in series four winding bodies 22 that are housed in a slot group that is adjacent on a first circumferential side of the slot group in which the third small coil group U201 and a fourth small coil group U202 are housed, and are revolution coils that are mounted so as to make approximately one round (360 mechanical degrees) circumferentially around the armature core.

The first small coil group U101, the third small coil group U201, and the fifth small coil group U301, which are housed in slots 13 that are offset by an electrical angle of $(\pi+\pi/9)$ from each other, are linked in series. Similarly, the second small coil group U102, the fourth small coil group U202, and the sixth small coil group U302, which are housed in slots 13 that are offset by an electrical angle of $(\pi+\pi/9)$, are linked in series.

In addition, a sub-coil in which the first small coil group U101, the third small coil group U201, and the fifth small coil group U301 are connected in series, and a sub-coil in which the second small coil group U102, the fourth small coil group U202, and the sixth small coil group U302 are connected in series, are connected in parallel. A U-phase coil that is formed by connecting in parallel two sub-coils in which twelve winding bodies 22 are connected in series is produced thereby. In each of the sub-coils that are connected in parallel in this U-phase coil, two small coil groups that are housed in an identical slot group are connected at positions that have identical order when viewed from the electric power supplying end. In other words, the first small coil group U101 and the second small coil group U102, which are housed in an identical slot group, are connected so as to be in a first position from the electric power supplying end of each of the parallel-connected sub-coils. Similarly, the third small coil group U201 and the fourth small coil group U202, which are housed in an identical slot group, are connected so as to be in a third position from the electric power supplying end of each of the parallel-connected sub-coils. Similarly, the fifth small coil group U301 and the sixth small coil group U302, which are housed in an identical slot group, are connected so as to be in a second position from the electric power supplying end of each of the parallel-connected sub-coils.

A V-phase coil and a W-phase coil are also formed in a similar or identical manner to that of the U-phase coil. An armature winding is thereby obtained that is constituted by a three-phase alternating-current winding that is a distributed winding of full-pitch windings by wye-connecting a U-phase coil, a V-phase coil, and a W-phase coil.

In Embodiment 5, because the small coil groups (revolution coils) that constitute each of the phase coils are each configured by connecting four winding bodies 22 that are arranged so as to be 360 electrical degrees apart in a circumferential direction in series in order of circumferential arrangement, lengths of the crossover portions that connect the winding bodies 22 together can also be shortened.

The phase coils are configured by connecting in parallel two sub-coils that are produced by connecting in series one small coil group that is housed in each of the slot groups. Here, because small coil groups that are housed in an identical slot group are connected so as to be at positions that have identical order when viewed from the electric power supplying end in each of the sub-coils that is connected in parallel, electric potential differences that arise between the conductor wires inside the slots 13 can be reduced. As a result, because insulating material between the conductor wires inside the slots 13, such as the thickness of the insulating coating that is coated onto the conductor wire, for example, can be made thinner, cross-sectional area of the conductor portion of the conductor wire can be increased proportionately to increase space factor, enabling increased efficiency and improvements in heat radiating characteristics to be expected.

Moreover, in Embodiment 5, it has been possible to confirm that electric potential differences between the conductor wires inside the slots 13 can be suppressed to a maximum of 46.9 percent of the inter-phase voltages. To find this electric potential difference, voltage drop that arises in a single turn of the winding bodies 22 was calculated, the electric potential difference that arises in conductor wires that are housed inside an identical slot 13 was calculated and compared in all of the slots 13, and the maximum electric potential difference was used.

Moreover, in Embodiments 1 through 5 above, the winding bodies 22 are configured by winding jointless continuous conductor wires helically, but winding bodies may be configured by winding conductor wires helically that are produced by linking short conductors, for example.

Embodiment 6

Figure 28:
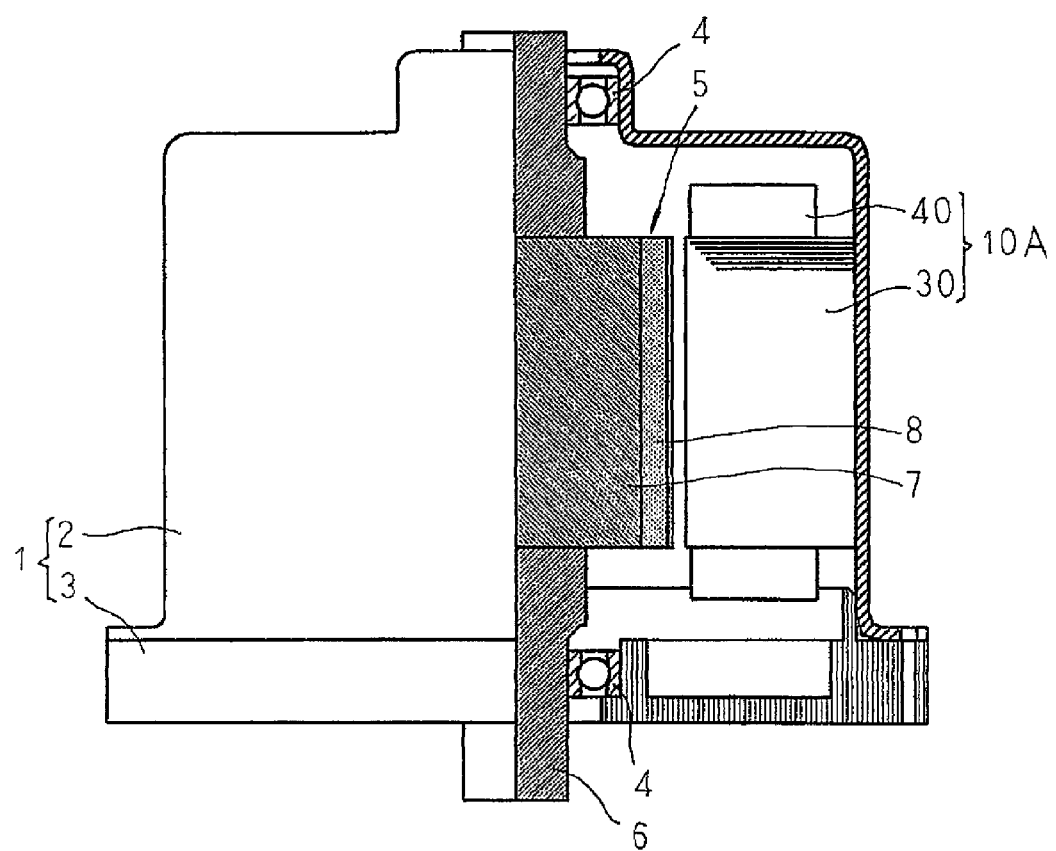
FIG. 28 is a half section that shows a rotary electric machine according to Embodiment 6 of the present invention.
Figure 29:
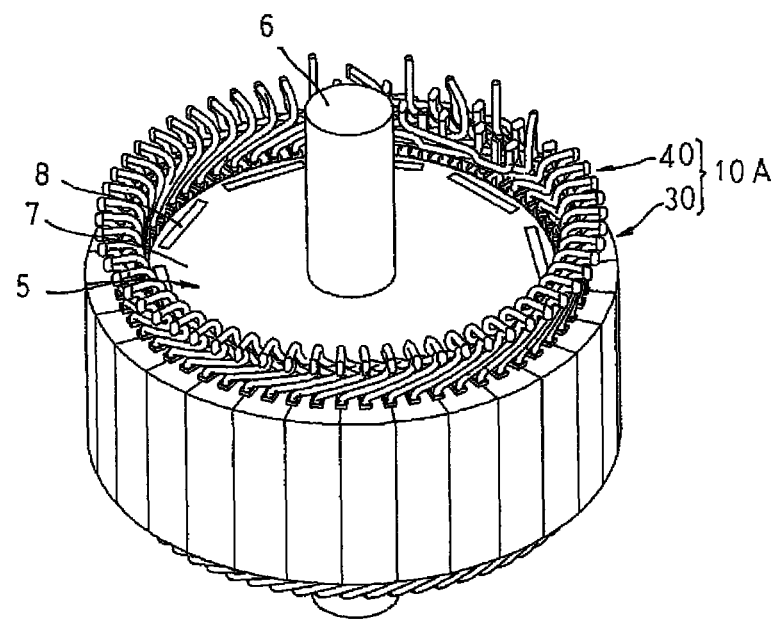
FIG. 29 is an oblique projection that shows part of the rotary electric machine according to Embodiment 6 of the present invention.
Figure 30:
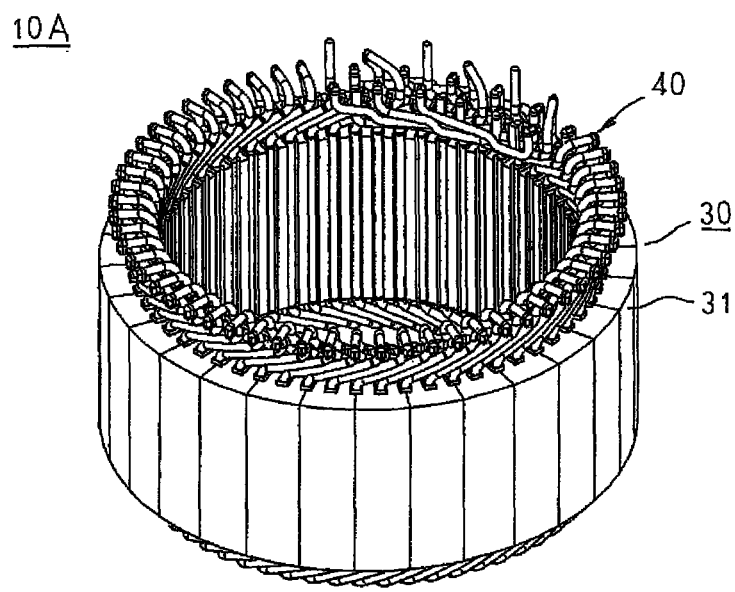
FIG. 30 is an oblique projection that shows an armature that is used in the rotary electric machine according to Embodiment 6 of the present invention.
Figure 31:
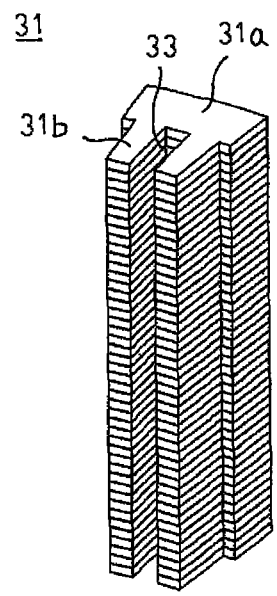
FIG. 31 is an oblique projection that shows a core block that constitutes an armature that is used in the rotary electric machine according to Embodiment 6 of the present invention.
Figure 32:
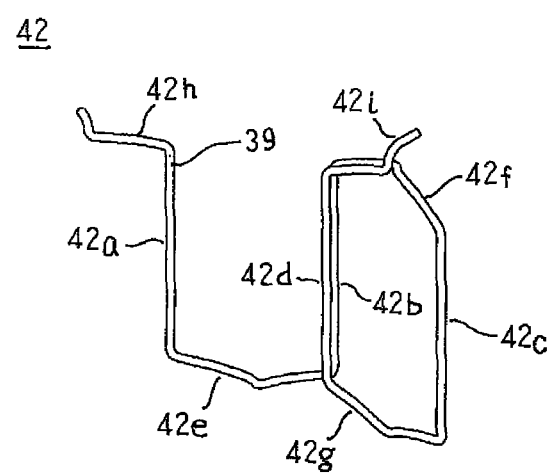
FIG. 32 is an oblique projection that shows a winding body that constitutes a winding assembly in the rotary electric machine according to Embodiment 6 of the present invention.
Figure 33:
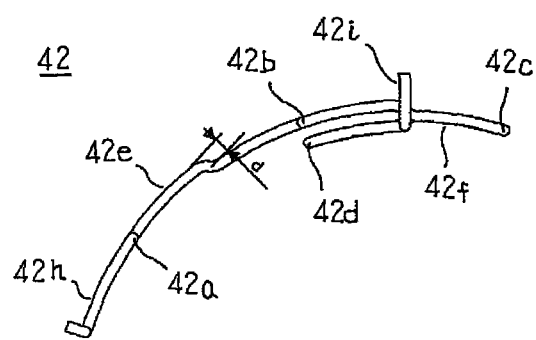
FIG. 33 is a plan that shows a winding body that constitutes the winding assembly in the rotary electric machine according to Embodiment 6 of the present invention.
Figure 34:
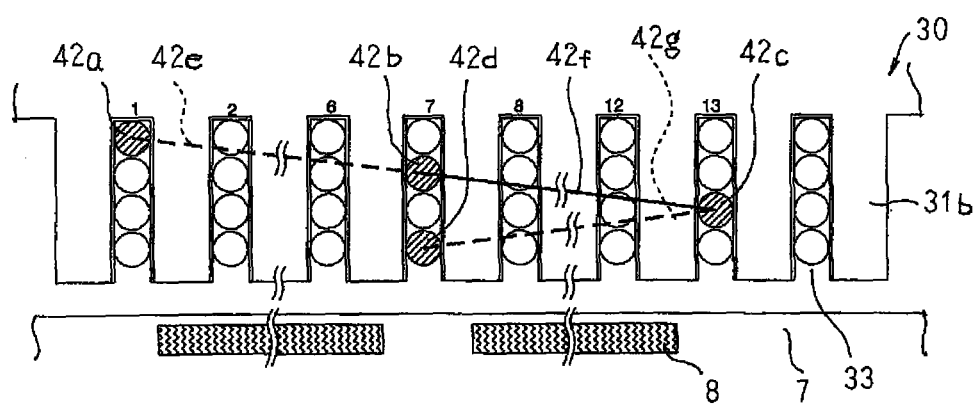
FIG. 34 is a schematic diagram that explains a state in which the winding bodies that constitute the armature winding in the rotary electric machine according to Embodiment 6 of the present invention are housed in slots.
Figure 35:
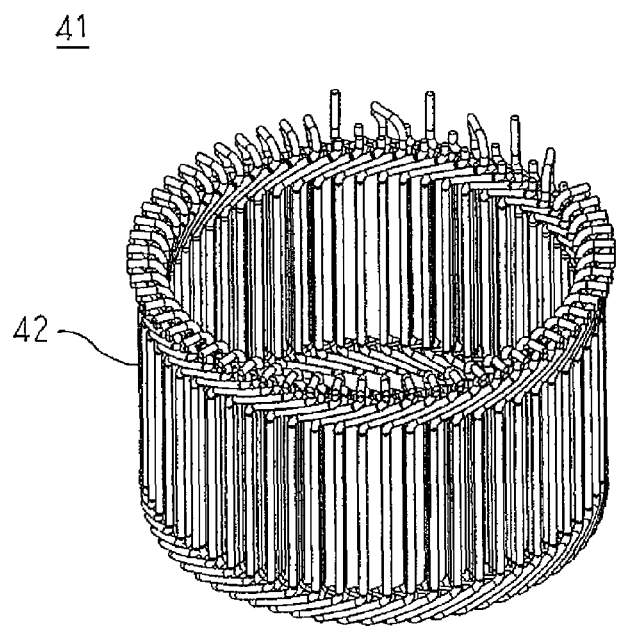
FIG. 35 is an oblique projection that shows the winding assembly that constitutes the armature winding of the armature that is used in the rotary electric machine according to Embodiment 6 of the present invention.
Figure 36:
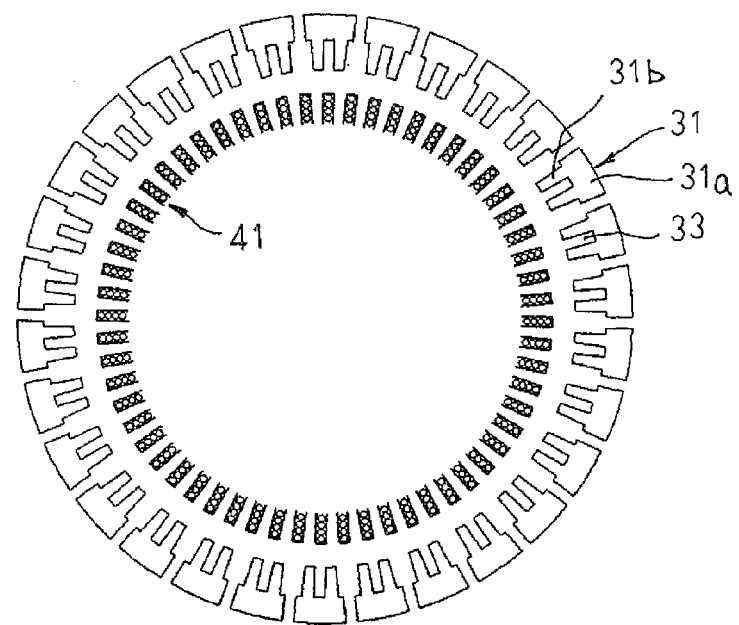
FIG. 36 is a diagram that explains a method for assembling the armature in the rotary electric machine according to Embodiment 6 of the present invention.
Figure 37:
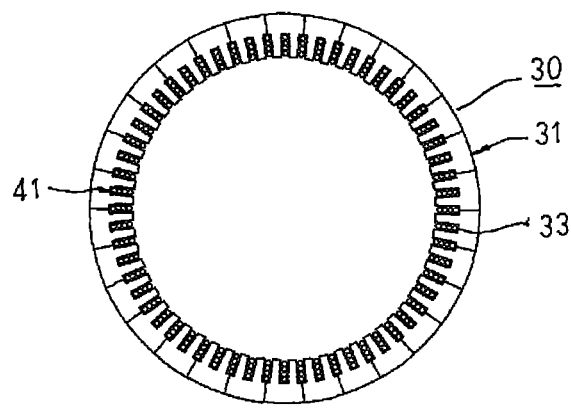
FIG. 37 is a diagram that explains the method for assembling the armature in the rotary electric machine according to Embodiment 6 of the present invention.

FIG. 28 is a half section that shows a rotary electric machine according to Embodiment 6 of the present invention, FIG. 29 is an oblique projection that shows part of the rotary electric machine according to Embodiment 6 of the present invention, FIG. 30 is an oblique projection that shows an armature that is used in the rotary electric machine according to Embodiment 6 of the present invention, FIG. 31 is an oblique projection that shows a core block that constitutes an armature that is used in the rotary electric machine according to Embodiment 6 of the present invention, FIG. 32 is an oblique projection that shows a winding body that constitutes a winding assembly in the rotary electric machine according to Embodiment 6 of the present invention, FIG. 33 is a plan that shows a winding body that constitutes the winding assembly in the rotary electric machine according to Embodiment 6 of the present invention, FIG. 34 is a schematic diagram that explains a state in which winding bodies that constitute the armature winding in the rotary electric machine according to Embodiment 6 of the present invention are housed in slots, FIG. 35 is an oblique projection that shows the winding assembly that constitutes the armature winding of the armature that is used in the rotary electric machine according to Embodiment 6 of the present invention, FIG. 36 is a diagram that explains a method for assembling the armature in the rotary electric machine according to Embodiment 6 of the present invention, and FIG. 37 is a diagram that explains the method for assembling the armature in the rotary electric machine according to Embodiment 6 of the present invention. In FIGS. 34, 1, 2, 6, 7, 8, 12, and 13 are slot numbers that have been allotted to slots 33 sequentially in a circumferential direction.

In FIGS. 28 and 29, a rotary electric machine 101 includes: a housing 1 that has: a floored cylindrical frame 2; and an end plate 3 that closes an opening of the frame 2; an armature 10A that is fixed to a cylindrical portion of the frame 2 in an internally fitted state; and a rotor 5 that is fixed to a rotating shaft 6 that is rotatably supported in the floor portion of the frame 2 and the end plate 3 by means of bearings 4 so as to be rotatably disposed on an inner circumferential side of the armature 10A. Moreover, the rotary electric machine 101 is configured in a similar or identical manner to the rotary electric machine 100 according to Embodiment 1 above except that the armature 10A is used instead of the armature 10.

Next, configuration of the armature 10A will be explained in detail with reference to FIGS. 30 through 35.

As shown in FIG. 30, the armature 10A includes: an armature core 30; and an armature winding 40 that is mounted onto the armature core 30. Here, to facilitate explanation, the number of poles p is ten, the number of slots s in the armature core 30 is sixty, and the armature winding 40 is a three-phase winding. In other words, the number of slots per phase per pole q is two.

As shown in FIG. 31, core blocks 31 are made by dividing the annular armature core 30 into thirty equal sections circumferentially, and include: a core back portion 31a that has a circular arc-shaped cross section, that is produced by laminating and integrating a predetermined number of electromagnetic steel sheets; and a tooth 31b that is disposed so as to extend radially inward from an inner circumferential wall surface of the core back portion 31a. The armature core 30 is configured into an annular shape by arranging and integrating thirty core blocks 31 circumferentially by abutting together circumferential side surfaces of the core back portions 31a such that the teeth 31b are oriented radially inward. The slots 33, which are formed between circumferentially adjacent teeth 31b, are arranged at a uniform angular pitch circumferentially so as to be open on an inner circumferential side. The teeth 31b are formed so as to have a tapered shape in which a circumferential width becomes gradually narrower radially inward, and a cross section of the slots 33 that is perpendicular to a central axis of the armature core 30 is rectangular.

As shown in FIGS. 32 and 33, a winding body 42 is produced by winding a conductor wire 39 that has a circular cross section that has a diameter d, that is made of jointless continuous copper wire or aluminum wire that is coated with an insulating enamel resin, for example, into a δ-shaped coil pattern (described below). Moreover, a conductor wire that has a rectangular cross section may be used in the winding body 22 instead of the conductor wire 39 that has a circular cross section.

The winding body 42 is produced by winding the conductor wire 39 into a δ-shaped coil pattern that are constituted by a first rectilinear portion 42a, a first coil end portion 42e, a second rectilinear portion 42b, a second coil end portion 42f, a third rectilinear portion 42c, a third coil end portion 42g, and a fourth rectilinear portion 42d. This winding body 42 is inserted into three slots 33 that are separated by an angular pitch of six slots (a pitch of one magnetic pole) from each other, as shown in FIG. 34. Specifically, the winding body 42 is mounted into the armature core 30 such that the first rectilinear portions 42a is inserted into the slots 33 at Number 1, the second and fourth rectilinear portions 42b and 42d are inserted into the slots 33 at Number 7, and the third rectilinear portions 42c is inserted into the slots 33 at Number 13.

The first, second, and third coil end portions 42e, 42f and 42g each include a crank portion that displaces by d radially. The first, second, third, and fourth rectilinear portions 42a, 42b, 42c and 42d are thereby inserted into the three slots 33 that are separated by the angular pitch of six slots (a pitch of one magnetic pole) from each other such that radial positions inside the slots 33 are changed radially inward from a radially outer side. A winding start of the conductor wire 39 that extends outward near a first end of the armature core 30 from the first rectilinear portion 42a that is inserted into the radially outermost position inside the slots 33 at Number 1 becomes a winding end 42h, and a winding finish of the conductor wire 39 that extends outward near the first end of the armature core 30 from the fourth rectilinear portion 42d that is inserted into the radially innermost position inside the slots 33 at Number 7 becomes a winding end 42i. These winding ends 42h and 42i are connected to other winding bodies 42, to electric power supplying portions, or to neutral points, etc.

Sixty winding bodies 42 that are configured in this manner are arranged circumferentially at a pitch of one slot to form a winding assembly 41, as shown in FIG. 35. In the winding assembly 41 that is configured in this manner, sixty columns of four (first, second, third, and fourth) rectilinear portions 42a, 42b, 42c and 42d are arranged circumferentially at an approximately uniform angular pitch.

To assemble the armature 10A, the thirty core blocks 31 are first arranged at an approximately uniform angular pitch circumferentially such that respective teeth 31b are positioned on a radially outer side between adjacent columns of first, second, third, and fourth rectilinear portions 42a, 42b, 42c and 42d of the winding assembly 41, as shown in FIG. 36. Next, the core blocks 31 that are arranged circumferentially are simultaneously moved radially inward. The respective teeth 31b of the core blocks 31 are thereby inserted between the adjacent columns of first, second, third, and fourth rectilinear portions 42a, 42b, 42c and 42d.

The circumferential side surfaces of the adjacent core blocks 31 are abutted with each other, preventing radially inward movement of the core blocks 31, and the winding assembly 41 is thereby mounted onto the armature core 30, as shown in FIG. 37. Inside each of the slots 33, four first, second, third, and fourth rectilinear portions 42a, 42b, 42c and 42d are housed so as to line up in a single column in a radial direction. A predetermined connection process (described below) is applied to the winding ends 42h and 42i of the winding assembly 41 to configure the armature winding 40. The armature 10A is produced thereby.

Figure 38:
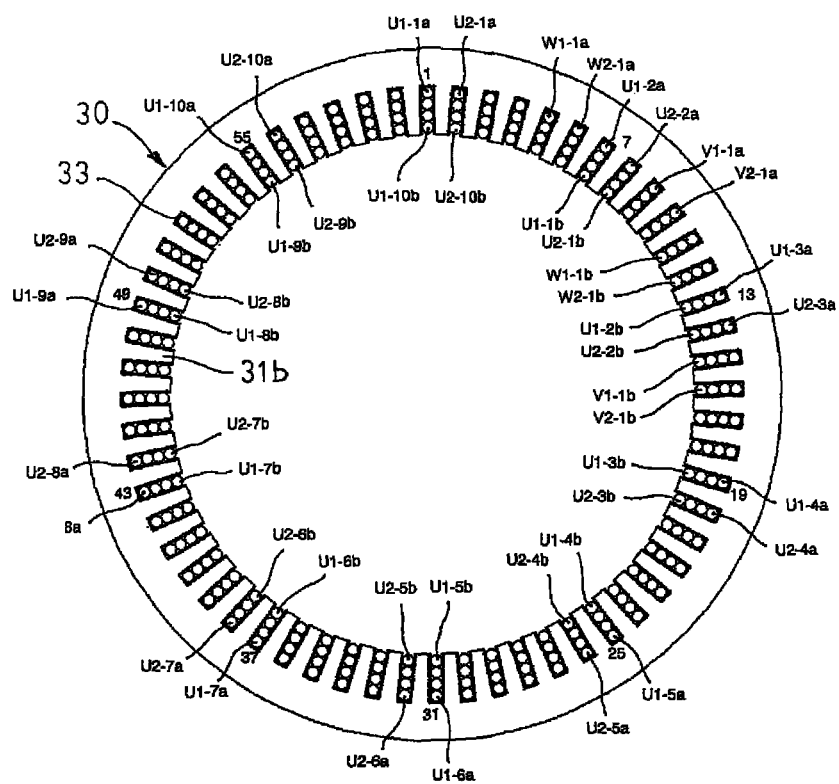
FIG. 38 is an end elevation of the armature in the rotary electric machine according to Embodiment 6 of the present invention when viewed from a side near a second axial end.
Figure 39:
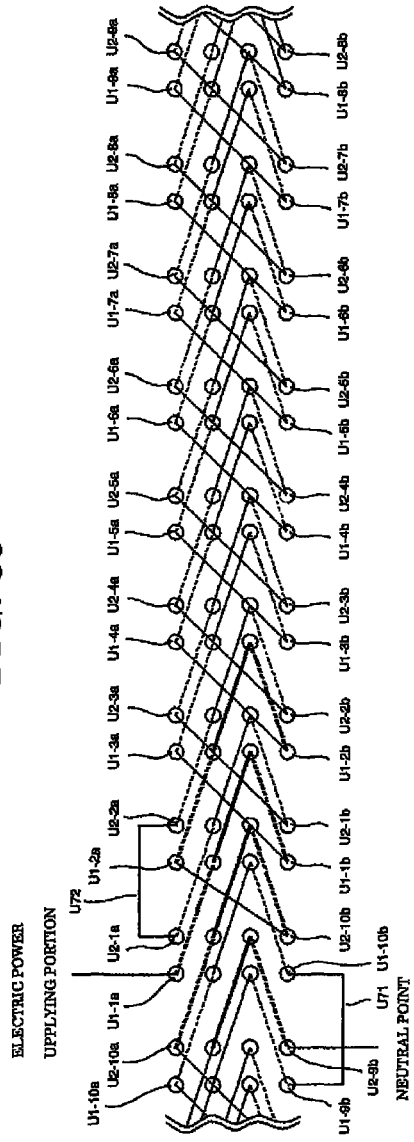
FIG. 39 is a connection diagram for a U-phase coil of the armature winding in the rotary electric machine according to Embodiment 6 of the present invention.
Figure 40:
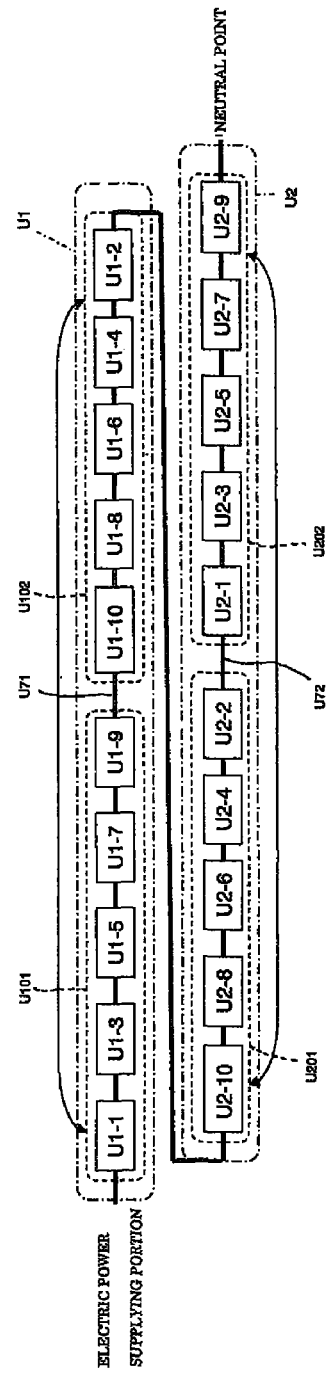
FIG. 40 is a schematic diagram that shows the U-phase coil of the armature winding in the rotary electric machine according to Embodiment 6 of the present invention.
Figure 41:
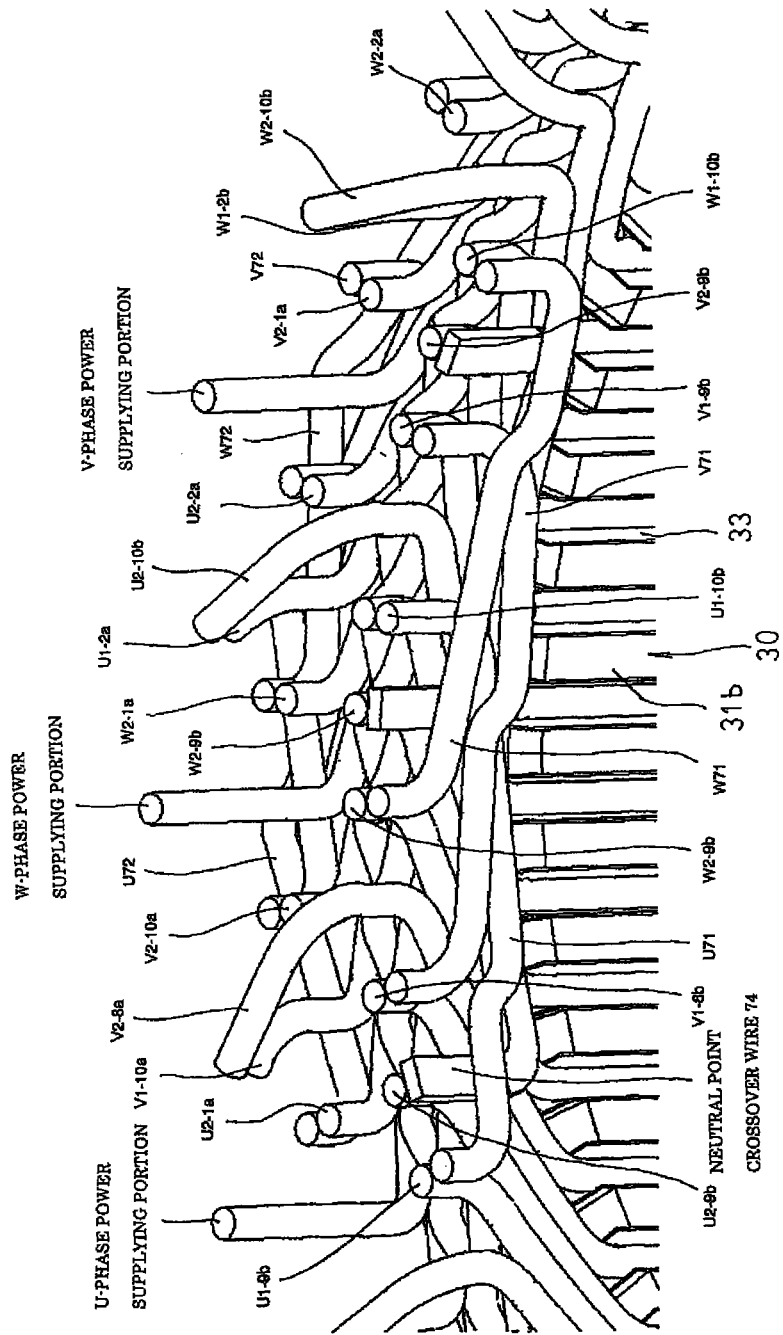
FIG. 41 is a partial oblique projection that shows a vicinity of electric power supplying portions of the armature winding in the rotary electric machine according to Embodiment 6 of the present invention.

Next, a method for connecting the armature winding 40 will be explained with reference to FIGS. 38 through 41. FIG. 38 is an end elevation of the armature in the rotary electric machine according to Embodiment 6 of the present invention when viewed from a side near a second axial end, FIG. 39 is a connection diagram for a U-phase coil of the armature winding in the rotary electric machine according to Embodiment 6 of the present invention, FIG. 40 is a schematic diagram that shows the U-phase coil of the armature winding in the rotary electric machine according to Embodiment 6 of the present invention, and FIG. 41 is a partial oblique projection that shows a vicinity of electric power supplying portions of the armature winding in the rotary electric machine according to Embodiment 6 of the present invention. In FIGS. 38, 1, 7, 13, etc., through 55 are slot numbers that have been allotted to the slots 33 sequentially in a circumferential direction.

First, in FIG. 38, U1-1a, U1-2a, etc., through U1-10a and U1-1b, U1-2b, etc., through U1-10B are winding ends 42h and 42*i* of winding bodies 42 that constitute a U1 phase that is mounted into a group of slots 33 at Slot Numbers (1+6n), where n is a natural number that includes 0, and U2-1*a*, U2-2*a*, etc., through U2-10*a* and U2-1*b*, U2-2*b*, etc., through U2-10*b* are 42*h* and 42*i* of winding bodies 42 that constitute a U2 phase that is mounted into a group of slots 33 at Slot Numbers (2+6n).

Winding bodies 42 are also mounted into a slot group at Slot Numbers (3+6n) to constitute a V1 phase, and winding bodies 42 are mounted into a slot group at Slot Numbers (4+6n) to constitute a V2 phase. Winding bodies 42 are also mounted into a slot group at Slot Numbers (5+6n) to constitute a W1 phase, and winding bodies 42 are mounted into a slot group at Slot Numbers (6+6n) to constitute a W2 phase. Here, to facilitate explanation, only V1-1*a* and V1-1*b* (winding ends of the winding bodies 42 that constitute the V1 phase), V2-1*a* and V2-1*b* (winding ends of the winding bodies 42 that constitute the V2 phase), W1-1*a* and W1-1*b* (winding ends of the winding bodies 42 that constitute the W1 phase), and W2-1*a* and W2-1*b* (winding ends of the winding bodies 42 that constitute the W2 phase) are shown.

Next, a method for connecting first through fourth small coil groups U101, U102, U201, and U202 that constitute a U-phase coil will be explained based on FIG. 39. Moreover, because the V-phase coil and the W-phase coil are also connected in a similar manner to the U-phase coil, explanation thereof will be omitted here.

U1-1*b* and U1-3*a*, U1-3*b* and U1-5*a*, U1-5*b* and U1-7*a*, and U1-7*b* and U1-9*a* of winding bodies 42 that are separated by 360 electrical degrees are connected by welding, etc., to produce the first small coil group U101. Similarly, U1-2*b* and U1-4*a*, U1-4*b* and U1-6*a*, U1-6*b* and U1-8*a*, and U1-8*b* and U1-10*a* of winding bodies 42 that are separated by 360 electrical degrees are connected by welding, etc., to produce the second small coil group U102. In addition, U1-9*b* and U1-10*b* of winding bodies 42 that are inserted into slots 33 that are separated by an electrical angle of π are connected using a crossover wire U71 to produce a U1-phase coil that is configured by connecting the first small coil group 101 and the second small coil group 102 in series.

Similarly, U2-1*b* and U2-3*a*, U2-3*b* and U2-5*a*, U2-5*b* and U2-7*a*, and U2-7*b* and U2-9*a* of winding bodies 42 that are separated by 360 electrical degrees are connected by welding, etc., to produce the third small coil group U201. Similarly, U2-2*b* and U2-4*a*, U2-4*b* and U2-6*a*, U2-6*b* and U2-8*a*, and U2-8*b* and U2-10*a* of winding bodies 42 that are separated by 360 electrical degrees are connected by welding, etc., to produce the fourth small coil group U202. In addition, U2-1*a* and U2-2*a* of winding bodies 42 that are inserted into slots 33 that are separated by an electrical angle of π are connected using a crossover wire U72 to produce a U2-phase coil that is configured by connecting the third small coil group U201 and the fourth small coil group U202 in series.

The first, second, third, and fourth small coil groups U101, U102, U201, and U202 that are configured in this manner are each revolution coils that are mounted so as to make approximately one round (360 mechanical degrees) circumferentially around the armature core 30.

U2-10*b* of the U2-phase coil is extended and connected to U1-2*a* of a winding body 42 that is inserted into slots 33 that are separated by an electrical angle of (π−π/6) to produce a U-phase coil that is configured by connecting the U1-phase coil and the U2-phase coil in series. A U-phase coil that is connected in series in order of the first small coil group U101, the second small coil group U102, the third small coil group U201, and the fourth small coil group U202 from the electric power supplying portion toward the neutral point is obtained by making U1-1*a*, which constitutes a terminal of the U-phase coil, an electric power supplying portion, and U2-9*b*, which also constitutes a terminal of the U-phase coil, a neutral point, as shown in FIG. 40.

Moreover, in FIG. 40, U1-1, U1-2, etc., through U1-10 constitute a winding body 42 that is mounted into the slot group at Slot Numbers (1+6n), U1-1 corresponding to a winding body 42 in which a winding end 42*h* is inserted into the slots 33 at Number 1, U1-2 corresponding to a winding body 42 in which a winding end 42*h* is inserted into the slots 33 at Number 7, and U1-10 corresponding to a winding body 42 in which a winding end 42*h* is inserted into the slots 33 at Number 55. U2-1, U2-2, etc., through U2-10 constitute a winding body 42 that is mounted into the slot group at Slot Numbers (2+6n), U2-1 corresponding to a winding body 42 in which a winding end 42*h* is inserted into the slots 33 at Number 2, U2-2 corresponding to a winding body 42 in which a winding end 42*h* is inserted into the slots 33 at Number 8, and U2-10 corresponding to a winding body 42 in which a winding end 42*h* is inserted into the slots 33 at Number 56.

In the armature winding 40 that is connected in this manner, as shown in FIG. 41, crossover wires U71, V71, and W71 are disposed so as to extend in a circumferential direction along an inner circumferential side of the coil ends so as to be electrically insulated from each other. Crossover wires U72, V72, and W72 are disposed so as to extend in a circumferential direction along an outer circumferential side of the coil ends so as to be electrically insulated from each other. The conductor wire that constitutes U2-10*b* is extended and connected to U1-2*a*, but U1-2*a* and U2-10*b* may be connected using a crossover wire.

Here, the U-phase coil, the V-phase coil, and the W-phase coil are multi-layer winding constructions in which three small coil groups are housed in one slot 33. As shown in FIG. 41, U2-9*b*, V2-9*b*, and W2-9*b* are connected using a neutral point crossover wire 74 to obtain an armature winding 40 that is formed by wye-connecting the U-phase coil, the V-phase coil, and the W-phase coil. The armature winding 40 constitutes a three-phase alternating-current winding that is a distributed winding of full-pitch windings. Thus, the rotary electric machine 100A constitutes a ten-pole, sixty-slot inner-rotor three-phase motor. Moreover, in the rotary electric machine 100A, the number of slots per phase per pole q is two, the number of poles p is ten, the number of winding bodies 42 that are housed in one slot 33 is three, and the number of small coil groups per phase (2q) is four, making the number of winding bodies 42 that constitute each of the small coil groups that are connected in series five (p/2).

In Embodiment 6, because the small coil groups that constitute each of the phase coils are each configured by connecting five winding bodies 42 that are arranged so as to be 360 electrical degrees apart in a circumferential direction in series in order of circumferential arrangement, lengths of the crossover portions that connect the winding bodies 42 together can be shortened. Thus, downsizing can be achieved without enlarging the coil ends of the armature winding 40 axially. Because the lengths of the crossover portions that connect the winding bodies 42 together are shorter, resistance in each of the phase coils that constitute the armature winding 40 also decreases, enabling increased efficiency.

The phase coils are configured by connecting four small coil groups in series. Here, because two small coil groups that are housed in an identical slot group are connected consecutively, electric potential differences that arise between the conductor wires inside the slots 33 can be reduced. In other words, as indicated by the arrows in FIG. 40, the winding bodies U1-1 and U1-2 are inserted into an identical slot 33, and the winding bodies U2-10 and U2-9 are inserted into an identical slot 33, maximizing the electric potential differences that arise between the conductor wires inside the slot 33, but the electric potential differences in question are suppressed to approximately half the phase voltage.

Because the small coil groups are linked together by crossover wires U71, U72, V71, V72, W71, and W72, connection of the small coil groups can be changed simply by modifying the shapes and positions of the conductor sheets that constitute the crossover wires U71, U72, V71, V72, W71, and W72, enabling design modifications to the armature winding 40 to be accommodated simply.

Embodiment 7

Figure 42:
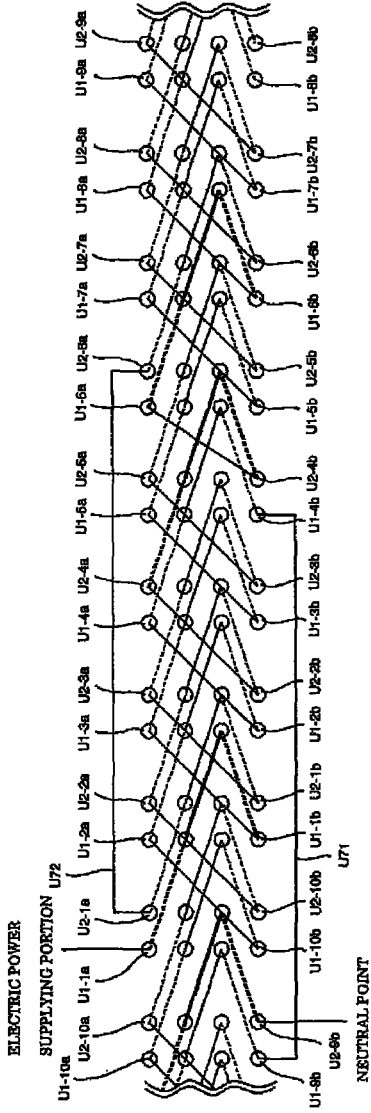
FIG. 42 is a connection diagram for a U-phase coil of an armature winding in a rotary electric machine according to Embodiment 7 of the present invention.
Figure 43:
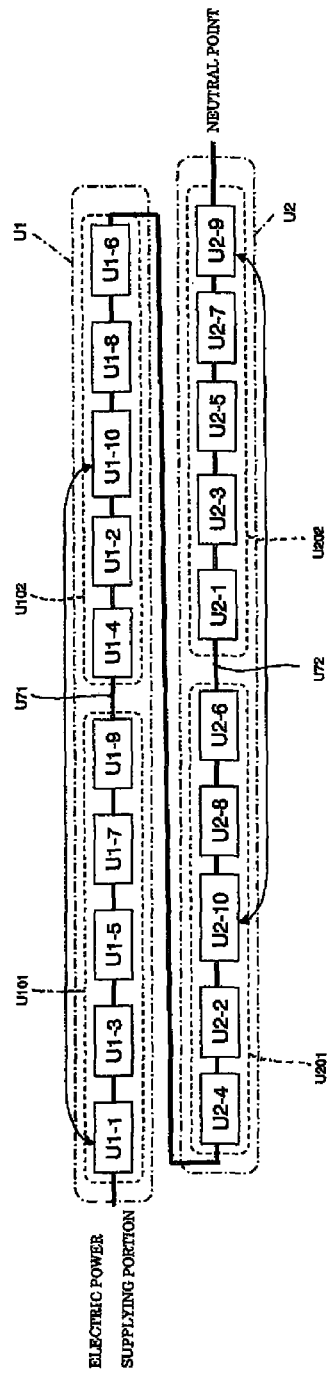
FIG. 43 is a schematic diagram that shows the U-phase coil of the armature winding in the rotary electric machine according to Embodiment 7 of the present invention.

FIG. 42 is a connection diagram for a U-phase coil of an armature winding in a rotary electric machine according to Embodiment 7 of the present invention, and FIG. 43 is a schematic diagram that shows the U-phase coil of the armature winding in the rotary electric machine according to Embodiment 7 of the present invention.

In FIGS. 42 and 43, U1-1*b* and U1-3*a*, U1-3*b* and U1-5*a*, U1-5*b* and U1-7*a*, and U1-7*b* and U1-9*a* of winding bodies 42 that are separated by 360 electrical degrees are connected by welding, etc., to produce a first small coil group U101. Similarly, U1-6*b* and U1-8*a*, U1-8*b* and U1-10*a*, U1-10*b* and U1-2*a*, and U1-2*b* and U1-4*a* of winding bodies 42 that are separated by 360 electrical degrees are connected by welding, etc., to produce a second small coil group U102. In addition, U1-9*b* and U1-4*b* of winding bodies 42 that are inserted into slots 33 that are separated by an electrical angle of 5π are connected using a crossover wire U71 to produce a U1-phase coil that is configured by connecting the first small coil group 101 and the second small coil group 102 in series.

Similarly, U2-1*b* and U2-3*a*, U2-3*b* and U2-5*a*, U2-5*b* and U2-7*a*, and U2-7*b* and U2-9*a* of winding bodies 42 that are separated by 360 electrical degrees are connected by welding, etc., to produce a third small coil group U201. Similarly, U2-6*b* and U2-8*a*, U2-8*b* and U2-10*a*, U2-10*b* and U2-2*a*, and U2-2*b* and U2-4*a* of winding bodies 42 that are separated by 360 electrical degrees are connected by welding, etc., to produce a fourth small coil group U202. In addition, U2-6*a* and U2-1*a* of winding bodies 42 that are inserted into slots 33 that are separated by an electrical angle of 5π are connected using a crossover wire U72 to produce a U2-phase coil that is configured by connecting the third small coil group U201 and the fourth small coil group U202 in series.

The first, second, third, and fourth small coil groups U101, U102, U201, and U202 that are configured in this manner are each revolution coils that are mounted so as to make approximately one round (360 mechanical degrees) circumferentially around the armature core 30.

U2-4*b* of the U2-phase coil is extended and connected to U1-6*a* of a winding body 42 that is inserted into a slot 33 that is separated by an electrical angle of (2π−π/6) to produce a U-phase coil that is configured by connecting the U1-phase coil and the U2-phase coil in series. A U-phase coil that is connected in series in order of the first small coil group U101, the second small coil group U102, the fourth small coil group U202, and the third small coil group U201 from the electric power supplying portion toward the neutral point is obtained by making U1-1*a*, which constitutes a terminal of the U-phase coil, an electric power supplying portion, and U2-9*b*, which also constitutes a terminal of the U-phase coil, a neutral point, as shown in FIG. 43.

A V-phase coil and a W-phase coil are also produced in a similar or identical manner to that of the U-phase coil.

Moreover, the rest of the configuration is formed in a similar or identical manner to that of Embodiment 6 above.

In Embodiment 7, the small coil groups that constitute each of the phase coils are each configured by connecting five winding bodies 42 that are arranged so as to be 360 electrical degrees apart in a circumferential direction in series in order of circumferential arrangement. The phase coils are formed by connecting four small coil groups in series, and two small coil groups that are housed in an identical slot group are connected consecutively. In addition, the small coil groups are linked together by crossover wires. Consequently, similar or identical effects to those of Embodiment 6 above can also be achieved in Embodiment 7.

In Embodiment 7, the second small coil group U102 is configured by connecting five winding bodies in series sequentially in order of U1-4, U1-2, U1-10, U1-8, and U1-6, and the fourth small coil group U202 is configured by connecting five winding bodies in series sequentially in order of U2-4, U2-2, U2-10, U2-8, and U2-6. Thus, as indicated by the arrows in FIG. 43, the winding bodies U1-1 and U1-10 and the winding bodies U2-10 and U2-9 are inserted into identical slots 33, maximizing the electric potential differences that arise between the conductor wires inside the slots 13, but the electric potential differences are less than the maximum electric potential differences in Embodiment 6 above.

Thus, the maximum electric potential differences that arise between the conductor wires inside the slots 33 can be kept small by changing the order of connection of the winding bodies that constitute the small coil groups. Here, because the crossover wires are used to connect the small coil groups together, connection can be made simply even if the connection distances between the small coil groups are lengthened.

Embodiment 8

Figure 44:
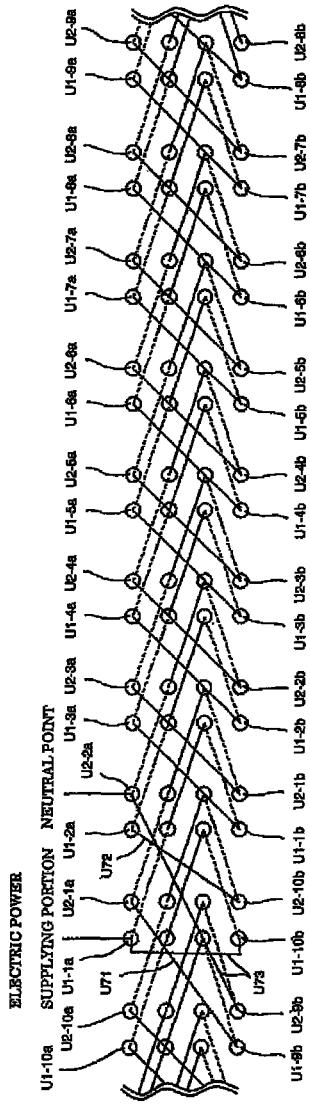
FIG. 44 is a connection diagram for a U-phase coil of an armature winding in a rotary electric machine according to Embodiment 8 of the present invention.
Figure 45:
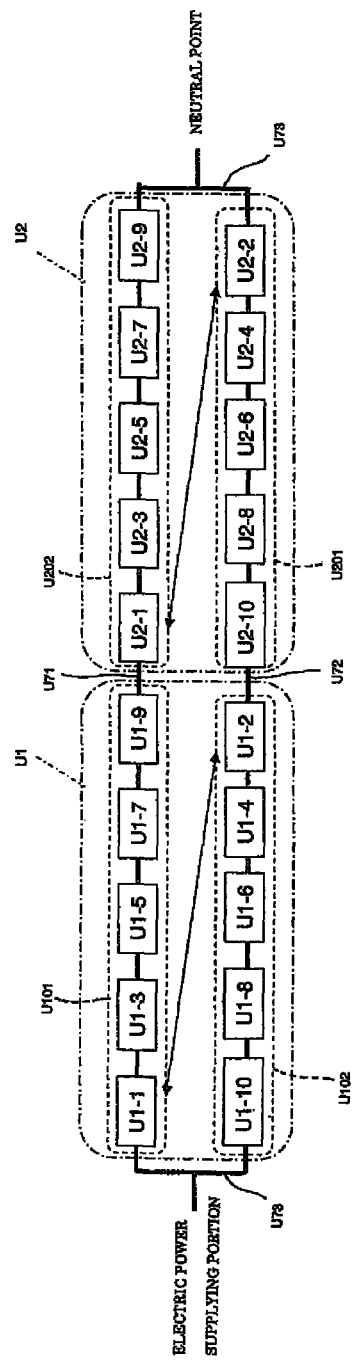
FIG. 45 is a schematic diagram that shows the U-phase coil of the armature winding in the rotary electric machine according to Embodiment 8 of the present invention.

FIG. 44 is a connection diagram for a U-phase coil of an armature winding in a rotary electric machine according to Embodiment 8 of the present invention, and FIG. 45 is a schematic diagram that shows the U-phase coil of the armature winding in the rotary electric machine according to Embodiment 8 of the present invention.

In FIGS. 44 and 45, U1-1*b* and U1-3*a*, U1-3*b* and U1-5*a*, U1-5*b* and U1-7*a*, and U1-7*b* and U1-9*a* of winding bodies 42 that are separated by 360 electrical degrees are connected by welding, etc., to produce a first small coil group U101. Similarly, U1-2*b* and U1-4*a*, U1-4*b* and U1-6*a*, U1-6*b* and U1-8*a*, and U1-8*b* and U1-10*a* of winding bodies 42 that are separated by 360 electrical degrees are connected by welding, etc., to produce the second small coil group U102.

Similarly, U2-2*b* and U2-4*a*, U2-4*b* and U2-6*a*, U2-6*b* and U2-8*a*, and U2-8*b* and U2-10*a* of winding bodies 42 that are separated by 360 electrical degrees are connected by welding, etc., to produce the third small coil group U201. Similarly, U2-1*b* and U2-3*a*, U2-3*b* and U2-5*a*, U2-5*b* and U2-7*a*, and U2-7*b* and U2-9*a* of winding bodies 42 that are separated by 360 electrical degrees are connected by welding, etc., to produce a fourth small coil group U202.

The first, second, third, and fourth small coil groups U101, U102, U201, and U202 that are configured in this manner are each revolution coils that are mounted so as to make approximately one round (360 mechanical degrees) circumferentially around the armature core 30.

U1-9*b* and U2-1*a* of winding bodies 42 that are inserted into slots 33 that are separated by an electrical angle of (π+π/6) are connected using a crossover wire U71 to produce a sub-coil that is configured by connecting the first small coil group 101 and the fourth small coil group 202 in series. U1-2*a* and U2-10*b* of winding bodies 42 that are inserted into slots 33 that are separated by an electrical angle of (π−π/6) are connected using a crossover wire U72 to produce a sub-coil that is configured by connecting the second small coil group 102 and the third small coil group 201 in series.

In addition, U1-1*a* and U1-10*b* are connected using a crossover wire U73, and U2-2*a* and U1-9*b* are connected using a crossover wire U73. A U-phase coil that is formed by connecting in parallel two sub-coils in which ten winding bodies 42 are connected in series is produced thereby. The connected portion of U1-1*a* and U1-10*b* becomes an electric power supplying portion, and the connecting portion of U2-2*a* and U1-9*b* becomes a neutral point.

In each of the sub-coils that are connected in parallel in this U-phase coil, two small coil groups that are housed in an identical slot group are connected at positions that have identical order when viewed from the electric power supplying end. In other words, the first small coil group 101 and the second small coil group 102, which are housed in an identical slot group, are each connected so as to be in a first position from the electric power supplying portion end of each of the sub-coils. Similarly, the third small coil group 201 and the fourth small coil group 202, which are housed in an identical slot group, are each connected so as to be in a second position from the electric power supplying portion end of each of the sub-coils.

A V-phase coil and a W-phase coil are also configured in a similar or identical manner to that of the U-phase coil.

Moreover, the rest of the configuration is formed in a similar or identical manner to that of Embodiment 6 above.

In Embodiment 8, because the small coil groups that constitute each of the phase coils are each configured by connecting five winding bodies 42 that are arranged so as to be 360 electrical degrees apart in a circumferential direction in series in order of circumferential arrangement, lengths of the crossover portions that connect the winding bodies 42 together can also be shortened, enabling downsizing to be achieved.

The phase coils are configured by connecting in parallel two sub-coils that are produced by connecting in series one small coil group that is housed in each of the slot groups. Here, because small coil groups that are housed in an identical slot group are connected so as to be at positions that have identical order when viewed from the electric power supplying end in each of the sub-coils that is connected in parallel, electric potential differences that arise between the conductor wires inside the slots 33 can be reduced.

Moreover, in Embodiments 6 through 8 above, the winding bodies are produced by winding conductor wires into a δ-shaped coil pattern, but winding bodies may be produced by winding conductor wires into a δ-shaped coil pattern a plurality of times consecutively.

Embodiment 9

Figure 46:
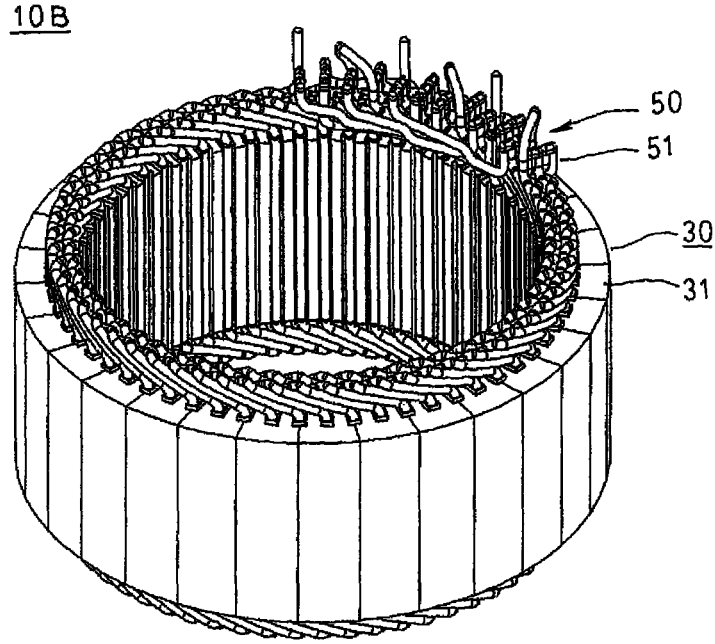
FIG. 46 is an oblique projection that shows an armature that is used in a rotary electric machine according to Embodiment 9 of the present invention.
Figure 47:
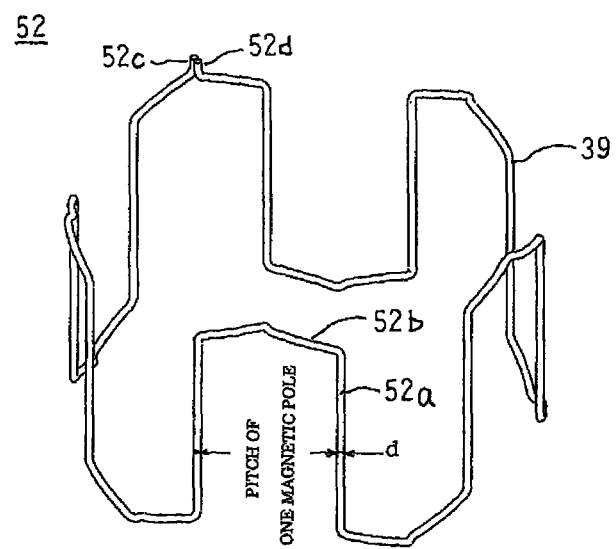
FIG. 47 is an oblique projection that shows a winding body that constitutes an armature winding that is used in the rotary electric machine according to Embodiment 9 of the present invention.
Figure 48:
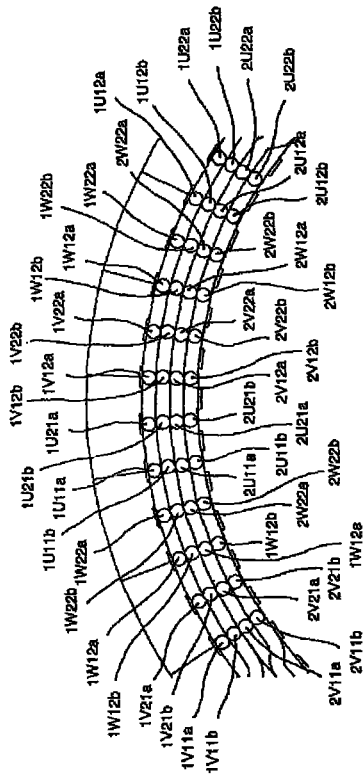
FIG. 48 is a plan that shows connecting wire portions of the armature winding in the rotary electric machine according to Embodiment 9 of the present invention.
Figure 49:
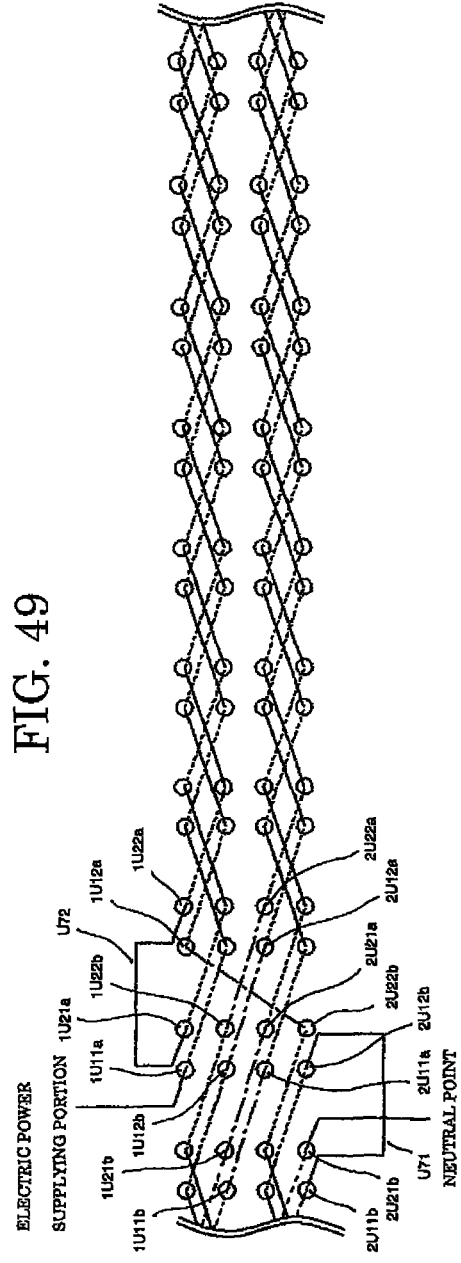
FIG. 49 is a connection diagram for a U-phase coil of the armature winding in the rotary electric machine according to Embodiment 9 of the present invention.
Figure 50:
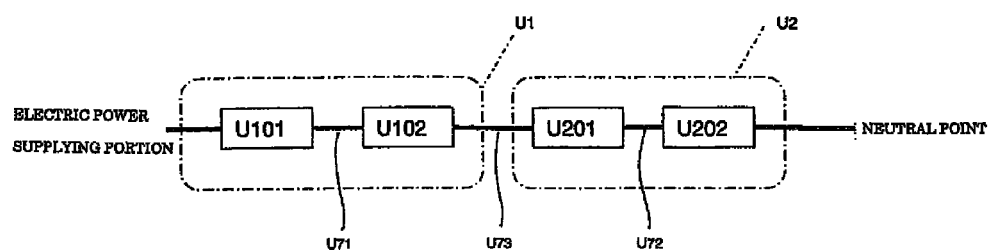
FIG. 50 is a schematic diagram that shows the U-phase coil of the armature winding in the rotary electric machine according to Embodiment 9 of the present invention.

FIG. 46 is an oblique projection that shows an armature that is used in a rotary electric machine according to Embodiment 9 of the present invention, FIG. 47 is an oblique projection that shows a winding body that constitutes an armature winding that is used in the rotary electric machine according to Embodiment 9 of the present invention, FIG. 48 is a plan that shows connecting wire portions of the armature winding in the rotary electric machine according to Embodiment 9 of the present invention, FIG. 49 is a connection diagram for a U-phase coil of the armature winding in the rotary electric machine according to Embodiment 9 of the present invention, and FIG. 50 is a schematic diagram that shows the U-phase coil of the armature winding in the rotary electric machine according to Embodiment 9 of the present invention.

In FIG. 46, an armature 10B includes: an armature core 30; and an armature winding 50 that is mounted onto the armature core 30. Here, to facilitate explanation, the number of poles p is ten, the number of slots s in the armature core 30 is sixty, and the armature winding 50 is a three-phase winding. In other words, the number of slots per phase per pole q is two.

As shown in FIG. 47, a revolution coil 52 is produced by winding a conductor wire 39 that has a circular cross section that has a diameter d, that is made of jointless continuous copper wire or aluminum wire that is coated with an insulating enamel resin, for example, for approximately one round into a wave winding on the armature core 30. Moreover, a conductor wire that has a rectangular cross section may be used in the revolution coil 52 instead of the conductor wire 39 that has a circular cross section.

The revolution coil 52 includes: ten rectilinear portions 52*a* that are arranged at an angular pitch of six slots (a pitch of one magnetic pole) circumferentially; and coil end portions 52*b* that alternately link first longitudinal end portions of adjacent rectilinear portions 52*a* to each other and second longitudinal end portions of adjacent rectilinear portions 52*a* to each other circumferentially. The coil end portions 52*b* each include a crank portion that displaces radially by d. The ten rectilinear portions 52*a* are thereby arranged circumferentially so as to alternate radial position between a radially inner side and a radially outer side. A winding start of the revolution coil 52 is a beginning 52*c*, and a winding finish constitutes a terminus 52*d*.

A winding assembly 51 is produced by arranging revolution coil groups in two layers radially, the revolution coil groups being produced by arranging twelve of these revolution coils 52 at a pitch of one slot circumferentially. In the winding assembly 51 that is produced in this manner, sixty columns of four rectilinear portions 52*a* that are lined up in a single column radially are arranged at a pitch of one slot circumferentially.

To assemble the armature 10B, thirty core blocks 31 are arranged at an approximately uniform angular pitch circumferentially such that respective teeth 31*b* are positioned on a radially outer side between adjacent columns of rectilinear portions 52*a* of the winding assembly 51. Next, the core blocks 31 that are arranged circumferentially are simultaneously moved radially inward. The respective teeth 31*b* of the core blocks 31 are thereby inserted between the adjacent columns of rectilinear portions 52*a*. The circumferential side surfaces of the adjacent core blocks 31 are abutted with each other, preventing radially inward movement of the core blocks 31, and the winding assembly 51 is thereby mounted onto the armature core 30. A connection process (described below) is applied to the beginnings 52*c* and the termini 52*d* of the revolution coils 52 that constitute the winding assembly 51 to configure the armature winding 50. The armature 10B is produced thereby.

Next, a connection method for the winding assembly 51 will be explained with reference to FIGS. 48 and 49. The winding assembly 51 is produced by weaving together twenty-four revolution coils 52. As shown in FIG. 48, the forty-eight beginnings 52c and termini 52d that constitute end portions of the twenty-four revolution coils 52 are concentrated in a range of a pitch of two magnetic poles in a circumferential direction.

Here, in order to explain the connection method, the beginnings 52c and the termini 52d of each of the revolution coils 52 will be represented by a five-character string as an expedient. A first (numeric) character of the character string represents radial positions inside the slots 33 of the rectilinear portions 52a that connect to the beginnings 52c and the termini 52d. Specifically, cases in which the rectilinear portions 52a that connect to the beginnings 52c and the termini 52d are housed first and second from a radially outer side inside the slots 33 will be designated "1", and cases in which they are housed third and fourth from the radially outer side inside the slots 33 will be designated "2". A second (alphabet) character of the character string represents the phase to which the revolution coil 52 belongs. A third (numeric) character of the character string represents the slot group in which the revolution coil 52 is housed, a first slot group being designated "1", and a second slot group being designated "2". In a fourth (numeric) character of the character string, in a group of revolution coils 52 for which the first three characters in the string are identical, the beginnings 52c and the termini 52d of the revolution coils 52 that connect to an end near the electric power supplying will be designated "1", and the beginnings 52c and the termini 52d of the revolution coils 52 that connect to an opposite end from the electric power supplying will be designated "2". In a fifth character of the character string, the beginnings 52c of the revolution coils 52 will be designated "a", and the termini 52d will be designated "b".

1U11b and 2U11a are first connected by welding, etc., to produce a two-turn first small coil group U101 in which two revolution coils 52 are connected in series, and 2U12a and 1U12b are connected by welding, etc., to produce a two-turn second small coil group U102 in which two revolution coils 52 are connected in series. Next, 2U11b and 2U12b are connected using a crossover wire U71 to produce U1-phase coil that is configured by connecting the first and second small coil groups U101 and U102 in series.

Next, 2U22a and 1U22b are connected by welding, etc., to produce a two-turn third small coil group U201 in which two revolution coils 52 are connected in series, and 1U21b and 2U21a are connected by welding, etc., to produce a two-turn fourth small coil group U202 in which two revolution coils 52 are connected in series. Next, 1U22a and 1U21a are connected using a crossover wire U72 to produce U2-phase coil that is configured by connecting the third and fourth small coil groups U201 and U202 in series.

Next, 1U12a and 2U22b are connected to produce a U-phase coil that is configured by connecting the U1-phase coil and the U2-phase coil in series. A U-phase coil that is connected in series in order of the first small coil group U101, the second small coil group U102, the third small coil group U201, and the fourth small coil group U202 from the electric power supplying portion toward the neutral point is obtained by making 1U11a, which constitutes a terminal of the U-phase coil, an electric power supplying portion, and 2U21b, which also constitutes a terminal of the U-phase coil, a neutral point, as shown in FIG. 50.

A V-phase coil and a W-phase coil are also formed in a similar or identical manner to that of the U-phase coil. An armature winding 50 is thereby obtained that is constituted by a three-phase alternating-current winding that is a distributed winding of full-pitch windings by wye-connecting a U-phase coil, a V-phase coil, and a W-phase coil.

In Embodiment 9, because the phase coils are configured by connecting the four first through fourth small coil groups U101, U102, U201, and U202 in series, and small coil groups that are housed in identical slot groups are connected consecutively, the electric potential differences that arise between the conductor wires inside the slots 33 can also be kept to approximately half the phase voltage.

In Embodiment 9, small coil groups that are housed in identical slot groups are connected consecutively, but the small coil group that are housed in identical slot groups may be connected alternately. In other words, the phase coils may be configured by connecting the first small coil group U101, the third small coil group U201, the second small coil group U102, and the fourth small coil group U202 in series in that order.

Embodiment 10

Figure 51:
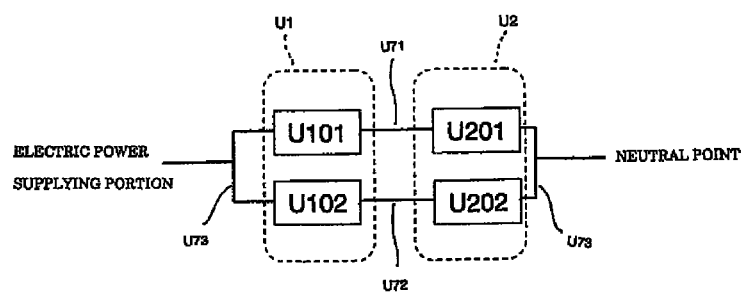
FIG. 51 is a connection diagram for a U-phase coil of an armature winding in a rotary electric machine according to Embodiment 10 of the present invention.

FIG. 51 is a connection diagram for a U-phase coil of an armature winding in a rotary electric machine according to Embodiment 10 of the present invention.

In Embodiment 10, a first small coil group U101, a second small coil group U102, a third small coil group U201, and a fourth small coil group U202 are configured in a similar or identical manner to those of Embodiment 9 above. A sub-coil is produced in which the first small coil group U101 and the third small coil group U201 are linked in series by connecting 2U11b and 1U22a using a crossover wire 71. Similarly, a sub-coil is produced in which the second small coil group U102 and the fourth small coil group U202 are linked in series by connecting 2U12b and 1U21a using a crossover wire 72.

In addition, 1U11a and 1U12a are connected using a crossover wire 73, and 2U22b and 2U21b are connected using a crossover wire 73. As shown in FIG. 51, a U-phase coil that is formed by connecting in parallel two sub-coils in which four revolution coils 52 are connected in series is produced thereby. In each of the sub-coils that are connected in parallel in this U-phase coil, two small coil groups that are housed in an identical slot group are connected at positions that have identical order when viewed from the electric power supplying end. In other words, the first small coil group U101 and the second small coil group U102, which are housed in an identical slot group, are connected so as to be in a first position from the electric power supplying end of each of the parallel-connected sub-coils. Similarly, the third small coil group U201 and the fourth small coil group U202, which are housed in an identical slot group, are connected so as to be in a second position from the electric power supplying end of each of the parallel-connected sub-coils.

A V-phase coil and a W-phase coil are also formed in a similar or identical manner to that of the U-phase coil. An armature winding is thereby obtained that is constituted by a three-phase alternating-current winding that is a distributed winding of full-pitch windings by wye-connecting a U-phase coil, a V-phase coil, and a W-phase coil.

In Embodiment 10, the phase coils are also configured by connecting in parallel two sub-coils that are produced by connecting in series one small coil group that is housed in a first slot group and one small coil group that is housed in a second slot group. Here, because small coil groups that are housed in an identical slot group are connected so as to be at positions that have identical order when viewed from the electric power supplying end in each of the sub-coils that is connected in parallel, electric potential differences that arise between the conductor wires inside the slots 13 can be reduced.

Moreover, in Embodiments 9 and 10 above, four revolution coils are housed in identical slot groups, but the number of revolution coils that are housed in identical slot groups is not limited to four, provided that it is 2m, where m is a natural number that is greater than or equal to two. The small coil groups should be configured by connecting in series two revolution coils that are constituted by radially adjacent conductor wires among the 2m conductor wires that are arranged in a single column radially inside the slots.

In Embodiments 9 and 10 above, the slots are formed at a ratio of two slots per phase per pole, but slots may be formed at a ratio of three or more slots per phase per pole.

In each of the above embodiments, an inner-rotor electric motor has been explained, but similar or identical effects are also exhibited if the present invention is applied to an outer-rotor electric motor.

In each of the above embodiments, cases in which the present application has been applied to an electric motor have been explained, but similar or identical effects are also exhibited if the present application is applied to a generator.

In each of the above embodiments, winding bodies are produced using conductor wires that are coated with insulation, but an insulation coating treatment may be applied to winding bodies that are produced using conductor wires that are not coated with insulation.

The invention claimed is:

1. A rotary electric machine comprising an armature that is configured by mounting an armature winding into an annular armature core, slots being formed on said armature core at a ratio of q slots per phase per pole, where q is a natural number that is greater than or equal to two,
   wherein:
   said armature winding is configured such that distributed-winding winding bodies are arranged at a pitch of one slot circumferentially, said winding bodies being configured by winding conductor wires into two or three of said slots that are separated by a pitch of one magnetic pole from each other;
   respective phase coils that constitute said armature winding comprise 2q revolution coils that make one round circumferentially that are formed by connecting in series in order of circumferential arrangement winding bodies that are housed in an identical slot group and that are separated by 360 electrical degrees; and
   each of said phase coils is configured by connecting said 2q revolution coils in series such that two of said revolution coils that are housed in said identical slot group are positioned consecutively or alternately.

2. The rotary electric machine according to claim 1, wherein connection between said revolution coils is configured using a crossover wire that is produced as a separate member from said conductor wires.

3. A rotary electric machine comprising an armature that is configured by mounting an armature winding into an annular armature core, slots being formed on said armature core at a ratio of q slots per phase per pole, where q is a natural number that is greater than or equal to two,
   wherein:
   said armature winding is configured such that distributed-winding winding bodies are arranged at a pitch of one slot circumferentially, said winding bodies being configured by winding conductor wires into two or three of said slots that are separated by a pitch of one magnetic pole from each other;
   respective phase coils that constitute said armature winding comprise 2q revolution coils that make one round circumferentially that are formed by connecting in series in order of circumferential arrangement winding bodies that are housed in an identical slot group and that are separated by 360 electrical degrees;
   each of said phase coils is configured by connecting two sub-coils in parallel, said sub-coils being configured by connecting in series revolution coils that are housed in different slot groups; and
   two of said revolution coils that are housed in an identical slot group are positioned at an identical position of order that is counted from an electric power supplying portion of each of said two sub-coils.

4. The rotary electric machine according to claim 3, wherein connection between said revolution coils is configured using a crossover wire that is produced as a separate member from said conductor wires.

5. A rotary electric machine comprising an armature that is configured by mounting an armature winding into an annular armature core, slots being formed on said armature core at a ratio of q slots per phase per pole, where q is a natural number that is greater than or equal to two,
   wherein:
   said armature winding comprises a plurality of revolution coils that are each formed by winding a conductor wire into a wave winding for one round circumferentially in a slot group that is constituted by said slots at a pitch of one magnetic pole so as to alternately occupy a radially inner side and a radially outer side inside said slots, 2m of said conductor wires being arranged in a single column radially in each of said slots, where m is a natural number that is greater than or equal to two;
   respective phase coils that constitute said armature winding comprise (m×q) small coil groups that are formed by connecting together in series revolution coils in which said conductor wires are radially adjacent inside said slots; and
   each of said phase coils is configured by connecting said (m×q) small coil groups in series such that m small coil groups that are housed in an identical slot group are positioned consecutively or alternately.

6. A rotary electric machine comprising an armature that is configured by mounting an armature winding into an annular armature core, slots being formed on said armature core at a ratio of q slots per phase per pole, where q is a natural number that is greater than or equal to two,
   wherein:
   said armature winding comprises a plurality of revolution coils that are each formed by winding a conductor wire into a wave winding for one round circumferentially in a slot group that is constituted by said slots at a pitch of one magnetic pole so as to alternately occupy a radially inner side and a radially outer side inside said slots, 2m of said conductor wires being arranged in a single column radially in each of said slots, where m is a natural number that is greater than or equal to two;
   respective phase coils that constitute said armature winding comprise (m×q) small coil groups that are formed by connecting together in series revolution coils in which said conductor wires are radially adjacent inside said slots;
   each of said phase coils is configured by connecting m sub-coils in parallel, said sub-coils being configured by connecting in series q of said small coil groups that are housed in different slot groups; and
   m of said small coil groups that are housed in an identical slot group are positioned at an identical position of order that is counted from an electric power supplying portion of each of said m sub-coils.

* * * * *